United States Patent [19]
Imanishi et al.

[11] Patent Number: 5,720,689
[45] Date of Patent: Feb. 24, 1998

[54] TRUNNION ARRANGEMENT FOR A TOROIDAL TYPE CONTINUOUSLY VARIABLE TRANSMISSION

[75] Inventors: Takashi Imanishi, Yokohama; Nobuo Gotoh, Fujisawa; Masami Tanaka, Maebashi, all of Japan

[73] Assignee: NSK Ltd., Tokyo, Japan

[21] Appl. No.: 609,567

[22] Filed: Mar. 1, 1996

[30] Foreign Application Priority Data

Mar. 3, 1995 [JP] Japan .................................. 7-044416
Mar. 3, 1995 [JP] Japan .................................. 7-044417

[51] Int. Cl.$^6$ .................................................. F16H 15/38
[52] U.S. Cl. ........................ 476/40; 476/46; 384/455; 384/621
[58] Field of Search .......................... 476/40, 46, 42; 384/455, 618, 621, 622, 623

[56] References Cited

U.S. PATENT DOCUMENTS

| | | | |
|---|---|---|---|
| 3,930,692 | 1/1976 | Condon, Jr. et al. | 384/455 |
| 4,955,246 | 9/1990 | Nakano. | |
| 5,158,375 | 10/1992 | Uchida et al. | 384/455 |
| 5,536,091 | 7/1996 | Takata et al. | 476/46 X |
| 5,547,432 | 8/1996 | Imanishi et al. | 476/40 |
| 5,575,736 | 11/1996 | Takemura | 476/40 |

FOREIGN PATENT DOCUMENTS

| | | |
|---|---|---|
| 62-71465 | 5/1987 | Japan. |
| 1-173552 | 12/1989 | Japan. |
| 2-2555 | 1/1990 | Japan. |
| 3-48119 | 5/1991 | Japan. |
| 6-37223 | 9/1994 | Japan. |
| 7-208569 | 8/1995 | Japan. |

*Primary Examiner*—Charles A. Marmor
*Assistant Examiner*—Troy Grabow
*Attorney, Agent, or Firm*—Shapiro and Shapiro

[57] ABSTRACT

For a toroidal type continuously variable transmission, the end portion of a radial needle bearing provided for a trunnion is protruded from the inner face of the trunnion. Also, the inner face of the trunnion is made substantially flat. Therefore, the processing of the trunnion is made easy, and the holder of the thrust needle bearing can be easily positioned simultaneously. Also, the structure is arranged to enable the recess formed on the trunnion to engage with the extrusion formed on the holder, thus preventing any plane pressure from being exerted excessively on the rolling surface of the needles of the thrust needle bearing, as well as preventing the needles from falling out of the pockets of the holder.

3 Claims, 26 Drawing Sheets

TRUNNION ARRANGEMENT FOR A TOROIDAL TYPE CONTINUOUSLY VARIABLE TRANSMISSION

BACKGROUND OF THE INVENTION

1. Field of the Invention

The present invention relates to a toroidal type continuously variable transmission used as a speed change gear for vehicles. More particularly, the invention relates to a toroidal type continuously variable transmission that makes it possible to enhance the efficiency of processing the inner surface of trunnions, and to position the holder of a thrust needle bearing easily. Also, the invention relates to a toroidal type continuously variable transmission provided with a thrust ball bearing and others the durabilities of which are enhanced.

2. Related Background Art

As a speed change gear for automobiles, for example, there has been studied the use of a toroidal type continuously variable transmission almost the same as the one shown schematically in FIGS. 6 and 7. As disclosed in Japanese Utility Model Application Laid-Open No. 62-71465, for example, this toroidal type continuously variable transmission supports a disk 2 on the input shaft side coaxially with the input shaft 1. A disk 4 on the output side is fixed to the end portion of an output shaft 3 arranged coaxially with the input shaft 1. On the inner side of a casing that houses the toroidal type continuously variable transmission, there are arranged the trunnions 6 and 6 that swing at a center of the pivots 5 and 5 installed orthogonal to the input shaft 1 and the output shaft 3.

For each of the trunnions 6 and 6, each of the pivots 5 and 5 is provided coaxially to each other on the outer side of both ends, respectively. Also, on each center of the trunnions 6 and 6, each base end of the displacement shafts 7 and 7 is supported, and each of the trunnions 6 and 6 is caused to swing centering on each center of the pivots 5 and 5. In this way, the tilt angles of the displacement shafts 7 and 7 can be adjusted freely. On the circumference of each of the displacement shafts 7 and 7 supported by the trunnions 6 and 6, each of the power rollers 8 and 8 is rotatively supported. Each of the power rollers 8 and 8 is nipped between the disks 2 and 4 arranged on the input and output sides, respectively. The cross-sections of the inner sides 2a and 4a of the disks 2 and 4 on the input and output sides, which face each other, are made concave by rotating the radii centering on the pivots 5 and 5, respectively. Then the circumferential surfaces 8a and 8a of the power rollers 8 and 8, each of which is formed spherically convex, are in contact with inner side faces 2a and 4a.

Between the input shaft 1 and the disk 2 on the input side, a pressure device 9 of a loading cam type is arranged. By means of this pressure device 9, the disk 2 on the input side is elastically pressed to the disk 4 on the output side. The pressure device 9 comprises a cam plate 10 that rotates together with the input shaft 1 and a plurality of rollers 12 and 12 (four rollers, for instance) supported by a holder 11. On one side face of the cam plate 10 (the left side face in FIGS. 6 and 7), a cam surface 13 is formed to present irregularities in the circumferential direction. Also, on the outer face of the disk 2 on the input side (the right side in FIGS. 6 and 7), a cam surface 14 is formed in the same manner. Then the plurality of rollers 12 and 12 are relatively supported centering on the axes in the radial directions with respect to the center of the input shaft 1.

When using the toroidal type continuously variable transmission structured as described above, the plurality of rollers 12 and 12 are pressed to the cam surface 14 of the outer side of the disk 2 on the input side by means of the cam surface 13 by the rotation of the cam plate 10 along the rotation of the input shaft 1. As a result, the disk 2 on the input side is pressed to the plurality of power rollers 8 and 8. At the same time, the disk 2 on the input side rotates in accordance with the engagement between the pair of cam surfaces 13 and 14 and the plurality of rollers 12 and 12 under pressure. Then the rotation of the disk 2 on the input side is transmitted to the disk 4 on the output side through the plurality of power rollers 8 and 8, thus causing the output shaft 3 fixed to the disk 4 on the output side to rotate.

In a case where a deceleration is performed at first between the input shaft 1 and output shaft 3 in order to change the rotational speeds of the input shaft 1 and output shaft 3, each of the trunnions 6 and 6 is allowed to swing cantering on each of the pivots 5 and 5. Then, each of the displacement shafts 7 and 7 is inclined so that, as shown in FIG. 6, each of the circumferences 8a and 8a of the power rollers 8 and 8 abuts upon the portion closer to the center of the inner face 2a of the disk 2 on the input side, and the portion closer to the outer circumference of the inner face 4a of the disk 4 on the output side, respectively.

On the contrary, in case of an acceleration, each of the displacement shafts 7 and 7 is inclined so that, as shown in FIG. 7, each of the circumferences 8a and 8a of the power rollers 8 and 8 abuts upon the portion closer to the outer circumference of the inner face 2a of the disk 2 on the input side, and upon the portion closer to the center of the inner face 4a of the disk 4 on the output side, respectively. If the tilt angle of each of the displacement shafts 7 and 7 is set at the middle of those represented in FIGS. 6 and 7, it is possible to obtain the intermediate change gear ratio between the input shaft 1 and output shaft 3.

Now, there has been known the structure of the portions that support the power rollers 8 and 8 to each of the trunnions 6 and 6 as disclosed in Japanese Utility Model Application Laid-Open No. 3-48119, for example. FIGS. 8 and 9 are views showing the conventional structure formed in accordance with the invention described in this laid-open application. Here, at first, the conventional structure will be described. A circular hole 15 is formed in the intermediate section of a trunnion 6. The hole 15 is formed in the direction perpendicular to the pivots 5 and 5 on both ends of the trunnion 6 (that is, the direction in which the line extending from the centers of the pivots 5 and 5 and the line extending from the center of the circular hole 15 are perpendicular to each other). Then, on the inner side portion of the circular hole 15, a displacement shaft 7 is supported. The displacement shaft 7 comprises a supporting shaft portion 16 and a pivot portion 17 formed parallel and eccentrically to each other. Of these portions, the supporting shaft portion 16 is rotatively supported inside the circular hole 15 through a radial needle bearing 18. Also, on the circumference of the pivot portion 17, a power roller 8 is rotatively supported through another radial needle bearing 19.

Also, between the outer side face of the power roller 8 and the inner side face of the intermediate section of the trunnion 6, a thrust ball bearing 20 and a thrust needle bearing 21 are arranged in order from he outer side face of the power roller 8. Of these bearings, the thrust ball bearing 20 bears the thrust load given to the power roller 8, and allows the power roller 8 to rotate. The thrust bearing 20 comprises a plurality of balls 22 and 22; an annular holder 23 for rotatively supporting each of the balls 22 and 22; and an annular outer ring 24 of the thrust bearing. The inner ring raceway of the thrust bearing 20 is formed on the outer side face of the power roller 8, and the outer ring raceway thereof is formed on the inner side face of the outer ring 24 of the thrust ball bearing, respectively.

Also, the thrust needle bearing 21 comprises a race 25; a holder 26; and needles 27 and 27. The race 25 of such thrust needle bearing 21 is nipped between the inner side face of the trunnion 6 and the outer side face of the outer ring 24 of the thrust ball bearing in a state where the race abuts upon the inner side face of the trunnion. Also, the race 25 and holder 26 are arranged to implement positioning the trunnion 6 when these members engage with the extrusion 28 formed on the inner side face of the trunnion 6. In other words, with a part of the inner side face of the trunnion 6, an annular extrusion 28 is formed on the circumference of the aperture of the circular hole 15, and then, the annular extrusion 28 is caused to enter each inner side of the circular holes 29 and 30 each formed on the race 25 and holder 26, respectively. As a result, the race 25 and holder 26 are supported in given positions on the inner side face of the trunnion 6.

In this respect, if the surface hardness of the inner side face of the trunnion 6 is made sufficiently high, it may be possible to omit the race 25, but the general practice is to provide the race 25. This provision is to secure a sufficient toughness of the trunnion 6. In other words, the trunnion 6 should bear a large thrust load exerted by the power roller 8, requiring a toughness good enough to secure a sufficient durability. Meanwhile, if the surface strength of the trunnion 6 itself is made greater, its toughness is lower. Therefore, it is difficult to secure both a lighter weight and a sufficient durability at the same time. Also, in order to use the inner side face of the trunnion 6 directly as the raceway surface of the bearing, there is a need for a grinding process to obtain a highly precise finish (with a smaller roughness) of the inner side face. It inevitably increases the manufacturing costs if grinding should be performed on the plane of a pouched portion whose ends are nipped by folded portions 32 and 32 as on the inner side face of the trunnion 6. Therefore, it is arranged to obtain the required surface strength of the thrust needle bearing 21 by the provision of the race 25.

The thrust needle bearing 21 structured as described above allows the pivot portion 17 and the outer ring 24 of the thrust ball bearing to swing centering on the supporting shaft portion 16, while bearing the thrust load exerted by each of the power rollers 8 on each of the outer rings 24 of the thrust ball bearing. In other words, there are some cases in the use of the toroidal type continuously variable transmission in which either one or both of the disks 2 and 4 (see FIGS. 6 and 7) on the input and output sides are displaced in the axial direction due to the gear change operation, changes in the torque to be transferred, elastic deformation of each structural member, and the like. Then, if such takes place, the displacement shaft 7 slightly rotates centering on the supporting shaft portion 16. As a result of this rotation, the outer side face of the outer ring 24 of the thrust ball bearing 20, and the inner side face of the trunnion 6 are caused to displace relatively. Since the thrust needle bearing 21 is present between the outer side face and inner side face, only a small force is needed for effectuating this relative displacement. As a result, the force required for changing the tilt angles can be small for each of the displacement shafts 7 and 7.

However, for the conventional toroidal type continuously variable transmission described above, it is not easy to manufacture the trunnions 6, inevitably leading to the increase of manufacture costs of the toroidal type continuously variable transmission as a whole. Hereunder, the reasons therefor will be described with reference to FIG. 10 in addition to FIG. 8.

The distance between the inner side face of the trunnion 6 and the center line of the pivots 5 and 5 arranged on both ends of the trunnion 6 should be accurately obtained by processing. The accurate finish is required for setting the contact positions appropriately for the circumferential surface 8a of the power roller 8 and the inner side faces 2a and 4a (see FIGS. 6 and 7) of the disks 2 and 4 on the input and output sides. Meanwhile, the trunnion 6 that requires a great strength is formed by a metallic material (mainly steel) by means of forging. However, the trunnion cannot be processed only by forging to obtain a finish as accurate enough to provide the target distance as described above. The obtainable plane on the inner side face with which the race 25 should be in contact is not flat and smooth sufficiently, either. Thus there is a need for the application of a cutting process given to the inner side face of the trunnion 6 after forging. Also, being required to secure such dimensional accuracy and flatness, the cutting tools cannot be changed depending on the machining portions (the positions in the surface direction), while in the cutting operation.

The efficiency of the cutting process should be improved more if the diameter of the rotational tool is larger for the intended processing, but the maximum diameter of the usable rotational tool is regulated by the configuration of the surface where such cutting operation is performed. For example, as shown in FIGS. 8 to 10, the maximum diameter d of the usable tool 31 should be the minimum value $D_{min}$ or less ($d \leq D_{min}$) of the distance between the extrusion 28 and the folded bending portions 32 and 32, each on the end of the trunnion 6, respectively, when the annular extrusion 28 is present on the intermediate section of the flat surface to be machined. Compared to the area of the flat plane to be machined, the minimum value $D_{min}$ is small. Therefore, it takes longer to machine the entire flat surface, leading to the inevitable increase of the manufacture costs of the trunnion 6.

With the omission of the extrusion 28, it becomes possible to use a tool of larger diameter for an easier processing of the trunnion 6, and implement the reduction of manufacturing costs of the trunnion 6, as well as the toroidal type continuously variable transmission in which this trunnion 6 is incorporated. However, if the extrusion 28 is just removed, the positioning of the holder 26 is disabled (that is, it becomes impossible to position the race 25 and holder 26 if the race should also be installed). In consideration of such difficult situation to follow, the present invention is designed so as to enhance the processing efficiency of the trunnion 6, while making the implementation of the positioning of the holder 26 possible.

Also, FIGS. 25 and 26 illustrate a toroidal type continuously variable transmission more specifically. This transmission is shown on a microfilm that discloses Japanese Utility Model Application No. 63-69293 (Japanese Utility Model Application Laid-Open No. 1-173552). A disk 2 on the input side and a disk 4 on the output side are rotatively supported, respectively, on the circumference of an input shaft 115 of a circular tube type through needle bearings 116 and 116. Also, by means of a spline, a cam plate 110 engages with the outer circumference of the end portion of the input shaft 115 (the left end portion in the axial direction in FIG. 25). Its movement is checked in the direction parting from the disk 2 on the input side by use of a flange 117. Then a loading cam type pressure device 9 is formed by this cam plate 110 and rollers 112 and 112. In accordance with the rotation of the input shaft 115, the pressure device 9 enables the disk 2 on the input side to rotate, while pressing it toward the disk 4 on the output side. The disk 4 on the output side is arranged to couple an output gear 118 by means of keys 119 and 119 so that the disk 4 on the output side and the output gear 118 can rotate in synchronism.

Both ends of a pair of trunnions 6 and 6 are supported by a pair of supporting plates 120 and 120 to allow them to swing, and also, to displace them in the axial direction (the direction from the front to rear in FIG. 25, and the direction from the left to right in FIG. 26). Then the displacement shafts 7 and 7 are supported on the portions of the intermediate sections of trunnions 6 and 6 where circular holes 123 and 123 are formed, respectively. Each of the displacement shafts 7 and 7 is provided with the supporting shaft portions 121 and 121, and pivot portions 122 and 122, which are formed to be parallel and eccentric to each other, respectively. Of these portions, the supporting shaft portions 121 and 121 are rotatively supported in the inner side of each of the circular holes 123 and 123 through the needle bearings 124 and 124. Also, on the circumference of each of the pivot portions 122 and 122, the power rollers 8 and 8 are rotatively supported through the other needle bearings 125 and 125.

In this respect, the pair of displacement shafts 7 and 7 described above are arranged in the positions, each 180 degrees opposite to the input shaft 115. Also, the direction, in which each of the pivot portions 122 and 122 of the respective displacement shafts 7 and 7 is formed eccentrically to each of the supporting shaft portions 121 and 121, is the same direction (the direction in which the left and right are inverted in FIG. 26) with respect to the rotational direction of the disks 2 and 4 on the input and output sides. Also, the direction of eccentricity is the direction substantially perpendicular to the arrangement direction of the output shaft 115. Therefore, each of the power rollers 8 and 8 is supported to be able to displace it slightly in the arrangement direction of the input shaft 115. As a result, even if each of the power rollers 8 and 8 tends to displace it in the axial direction of the input shaft 115 due to the variations of dimensional precisions, elastic deformation, and the like of the structural components, such displacement can be absorbed without exerting any excessive force on each of the components.

Also, between the outer side face of each of the power rollers 8 and 8, and the inner side face of the intermediate section of the respective trunnions 6 and 6, the thrust ball bearings 126 and 126, and thrust needle bearings 127 and 127 are arranged in that order from each side of the outer side face of the power rollers 8 and 8. Of these bearings, each of the thrust ball bearings 126 and 126 comprises a plurality of balls 129 and 129; annular holders 128 and 128 that hold each of the balls 129 and 129 rotatively; and annular outer rings 130 and 130. The inner ring raceway of each of the thrust ball bearings 126 and 126 is formed on the outer side face of each of the power rollers 8 and 8, and the outer ring raceway is formed on the inner side face of each of the outer rings 130 and 130, respectively.

Also, as shown in FIGS. 27 and 28 in detail, each of the thrust needle bearings 127 and 127 is formed by a race 131, a holder 132, and needles 133 and 133. Of these members, the race 131 and holder 132 are combined to be able to displace them slightly in the rotational direction. Also, the race 131 and holder 132 are provided with annular sections 134a and 134b centering on the pivot portion 122, and also, with extrusions 135a and 135b protruding outward from a part of each of the annular sections 134a and 134b in the diametral direction.

Such thrust needle bearings 127 and 127 are nipped between each inner side face of the races 131 and 131 and each outer side face of the outer rings 130 and 130, respectively, in a state that the races are in contact with the inner side face of each of the trunnions 6 and 6. In this respect, the direction in which each of the extrusions 135a and 135b is arranged is made identical to the direction of the pivot portions 122 and 122 eccentrically arranged with respect to the supporting shaft portions 121 and 121. Such thrust needle bearings 127 and 127 allow the pivot portions 122 and 122, and the outer rings 130 and 130 to swing centering on the supporting shaft portions 121 and 121, while bearing the thrust load exerted by each of the power rollers 8 and 8 on each of the outer rings 130 and 130.

Further, each of driving rods 136 and 136 is coupled to one end of each of the trunnions 6 and 6 (the left end portion in FIG. 26), and on the outer circumference in the intermediate section of the respective driving rods 136 and 136, each of driving pistons 137 and 137 is fixed. Then each of the driving pistons 137 and 137 is oil tightly fitted into each of driving cylinders 138 and 138.

With the toroidal type continuously variable transmission structured as described above, the rotation of the input shaft 115 is transmitted to the disk 2 on the input side. Then the rotation of the disk 2 on the input side is transmitted to the disk 4 on the output side through the pair of power rollers 8 and 8. Further, the rotation of the disk 4 on the output side is drawn out from the output gear 118. When the ratio of rotational speeds between the input shaft 115 and output gear 118 should be changed, the pair of the driving pistons 137 and 137 described above are displaced in opposite directions. Along with the displacement of each of the driving pistons 137 and 137, the trunnions 6 and 6 are displaced in opposite directions. For example, the power roller placed in the lower side in FIG. 26 is displaced to the right-hand side in FIG. 26, while the power roller 8 on the upper side in FIG. 26 is displaced to the left-hand side in FIG. 26, respectively. As a result, the force in the direction of the tangential line, which acts upon the contacting portion between the circumferences 8a and 8a of the power rollers 8 and 8, and the inner side faces 2a and 4a of the disks 2 and 4 on the input and output sides, is caused to change direction. Along with this directional change, the trunnions 6 and 6 swing in opposite directions centering on each of the pivots 5 and 5 supported by the respective supporting plates 120 and 120.

Consequently, as shown in FIGS. 6 and 7, the contacting positions are caused to change with respect to the circumferences 8a and 8a of the power rollers 8 and 8, as well as to the inner side faces 2a and 4a, hence changing the ratio of the rotational speeds between the input shaft 115 and output gear 118.

If, for example, the amount of elastic deformation of each component changes due to the changes of torque to be transferred, each of the displacement shafts 7 and 7 rotates slightly centering on each of the supporting shaft portions 121 and 121, thus making it possible for the power rollers 8 and 8 to follow the inner side faces 2a and 4a of the disks 2 and 4. As a result of this rotation, the outer side face of the outer rings 130 and 130 of the respective thrust ball bearings 126 and 126, and the inner side face of the respective trunnions 6 and 6 are displaced relatively. Here, between these outer side face and inner side face, each of the thrust needle bearings 127 and 127 is present. Therefore, only a small force is needed for the relative displacements. Accordingly, the requirement of force is also small for causing the power rollers 8 and 8 to follow the inner side faces 2a and 4a.

For the toroidal type continuously variable transmission structured to function as described above, it has been found by investigation that the durability of the outer ring that constitutes the thrust ball bearing 126 is not necessarily strong enough when the toroidal type continuously variable transmission is practically used as a change gear for use of automobiles or the like for the reasons given below. The thrust needle bearing 127 is structured including the race 131 and holder 132 being configured as shown in FIGS. 27 and 28, and nipped between the outer ring 130 of the thrust ball bearing 126 and the inner side face of trunnion 6. This needle bearing is not necessarily strong enough to bear the thrust load exerted on the outer ring 130 through the thrust ball bearing 126.

In other words, the objective of the thrust needle bearing 127 incorporated in the conventional toroidal type continuously variable transmission is to smoothly effectuate the relative displacement of the outer ring 130 and trunnion 6. There is no consideration given to backing up the outer ring 130 against the thrust load to be exerted as described above. As a result, when the outer ring 130 and the holder 132 configured as shown in FIG. 27 are superposed, a part of the outer ring 130 protrudes outward in the diametral direction from the outer circumferential edge of the holder 132. Then, the part of the outer ring 130 thus protruded cannot be supported by the needles 133 and 133 held by the holder 132.

On the other hand, the entire circumference of the outer ring 130 receives the thrust load exerted by a plurality of balls 129 and 129 that constitute the thrust ball bearing 126 in cooperation with the outer ring 130. Therefore, the bending stress acts upon the outer ring 130 centering on the boundary between the aforesaid part and remaining part of the outer ring due to the thrust load given to that part and the thrust load given to the remaining part. When a toroidal type continuously variable transmission is adopted as a change gear for use of automobiles, such bending stress becomes considerably great, and also, such stress is repeatedly exerted by the revolutionary motion of the plurality of balls 129 and 129. Consequently, the outer ring 130 tends to be damaged by cracks, surface peeling of the outer ring raceway, or the like, leading to the insufficient durability as the constituent of a toroidal type continuously variable transmission.

For example, according to experiments using the thrust needle bearings structured as the conventional one as shown in FIGS. 27 and 28, its peeling off occurs in an early stage on the outer ring raceway formed on the inner side face of the outer ring 130, and then, vibrations take place on the thrust ball bearing 126 portion. Each of the thrust needle bearings used for the experiments is provided with a main annular holder 139 and circular sub-holders 40a and 40b. A plurality of needles 133 and 133 are rotatively supported on each of the holders 139, 40a and 40b, respectively. Of these holders, the main holder 139 is arranged on the circumference of the supporting shaft portion 121 that forms the displacement shaft 7. The sub-holders 40a and 40b are arranged on the outer side portion of the main holder 139 by bringing them in line with the direction of the pivot portion 122 that is eccentric to the supporting shaft portion 121. Here, in FIG. 29, a reference numeral 41 designates a pocket formed on each of the holders 139, 40a and 40b. Reference numerals 42a and 42b designate the outer circumferential edge of the race 131 and inner circumferential edge thereof that form the thrust needle bearing.

The portion that divides the inner and outer circumferences by the inner and outer tangential circles of the plurality of needles 133 and 133 that form such thrust needle bearing, and the portion between the close and adjacent needles themselves become the load receiving portions capable of bearing the thrust load by means of the needles. In the case of the structure represented in FIG. 29, one doughnut shaped portion and two circular portions, and the portions between these portions themselves are those which receive the load as described above. In the case of the thrust needle bearing used for the experiment, approximately 65% of the circumferential length of the pitch circle a is included in the load receiving portion described above when the load receiving portion and the pitch circle a of the thrust ball bearing 126 are superposed and observed in the axial direction of the pivot portion 122. In other words, of the one-dot chain line representing the pitch circle a, the portion drawn by a thick line is included in the load receiving portion, but the portion drawn by a thin line is off the load receiving portion.

From this finding, it is confirmed that no sufficient durability is obtainable just by the provision of a backup that covers against the thrust load only 65% of the pitch circle a of the balls 129 and 129 forming the thrust ball bearing. Taking this situation into account, a toroidal type continuously variable transmission as shown in FIGS. 30 to 33 (Japanese Patent Application No. 6-5997), laid open as Japanese Patent Application Laid-Open No. 7-208569, has been proposed.

FIG. 30 represents a first structural example of the previous invention as described above. A thrust needle bearing 127a Comprises an annular main holder 139A and a circular sub-holder 40A. Compared to the toroidal type continuously variable transmission structured conventionally as shown in FIG. 29, the toroidal type continuously variable transmission of the previous invention makes the diameter of the main holder 139A larger (than that of the main holder 139 shown in FIG. 29). Then the main holder 139A is arranged centering on the pivot portion 122 that forms the displacement shaft 7.

On the main holder 139A, a plurality of pockets 41 and 41 are formed in the radial direction centering on the pivot portion 122. Each of these pockets 41 and 41 holds each of the needles 133 and 133 rotatively. These needles 133 and 133 are arranged at pitches between the adjacent needles 133 and 133 set at 5% or less, even at the maximum, of the circumferential length of the pitch circle a of the balls 129 and 129 forming the thrust ball bearing 126.

Therefore, if the needles 133 and 133 should be arranged at an equal pitch between each of them, it is necessary to make the number of needles 133 and 133 twenty or more. Here, the needles 133 and 133 are not necessarily arranged at equal pitches. However, if these needles are arranged at different pitches, the minimum number of the needles 133 and 133 required should be increased so that even the maximum pitch among them is set within a 5% of the circumferential length described above. Generally, in this respect, fifty to thirty-three needles 133 and 133 are arranged at an equal pitch between them so that the pitch described above should be two to three percent of the circumferential length described above.

The portion that divides the inner and outer circumferences by the inner and outer tangential faces of these plural needles 133 and 133 (the annular portion where the plurality of needles 133 and 133 are arranged) is the load receiving portion capable of bearing the thrust load by means of these needles 133 and 133. In the case of the first structural example shown in FIG. 30, the entire length of the pitch circle a is included in the load receiving portion when this load receiving portion and the pitch circle a of the plurality of balls 129 and 129 that form the thrust ball bearing 126 are superposed in the axial direction of the pivot portion 122 (the direction from the front to the rear of FIG. 30). In other words, in accordance with this structural example, the pitch circle a is included 100% in the load receiving portion as described above.

Also, a race 131A made of a hard metallic plate is attached to the inner side face of the trunnion 6 with which each rolling surface of the plural needles 133 and 133 is in contact. The outer circumferential edge 42a of the race 131A is substantially coaxial with the pivot portion 122, while the inner circumferential edge 42b is substantially coaxial with the supporting shaft portion 121 that forms the displacement shaft 7 in cooperation with the pivot portion 122.

Meanwhile, the structure of the sub-holder 40A is different from the one shown in FIG. 29. The sub-holder is arranged on the circular arc formed centering on the supporting shaft portion 121 inside the main holder 139A. On the portion of a part of the race 131A, which faces the outer circumferential edge of the sub-holder 40A, a circular extrusion 43 is formed also centering on the supporting shaft portion 121. The sub-holder 40A is positioned between this extrusion 43 and the outer circumferential surface of the supporting shaft portion 121. Then, the needles 133 and 133 held in the pockets 41 and 41 of the sub-holder 40A bear the portion closer to the inner circumference eccentric to the supporting shaft portion on a part of the outer side face of the outer ring 130.

When operating the toroidal type continuously variable transmission of the previous invention structured as described above, the power roller 8 (see FIGS. 6, 7, 25 and 26) is displaced in accordance with the swinging of each of the disks 2 and 4 (see FIGS. 6, 7 and 25), the elastic deformation of each member, and the like. Then, along this displacement, the outer side face of the outer ring 130 and the inner side face of the trunnion 6 are relatively displaced. This relative displacement is performed by the application of a slight force along the rolling direction of the plurality of needles 133 and 133 that form the thrust needle bearing 127. Also, since the amount of displacement of the power roller 8 and outer ring 130 is small, there is no possibility that the pitch circle a is off the load receiving portion following this displacement.

In other words, in accordance with the toroidal type continuously variable transmission of the previous invention, the outer ring 130 is backed up over the entire length of the circular pitch a of the balls 129 and 129 (the thrust load is supported on the outer side face) irrespective of the displacement of the power roller 8 and outer ring 130 as described above. Therefore, even if the thrust load is repeatedly exerted on the power roller 8 through the balls 129 and 129 along the operation of the toroidal type continuously variable transmission, any large bending stress can hardly be given to the outer ring 130. As a result, there is a lesser possibility of damages occurring on the outer ring 130, such as the peeling off of the outer ring raceway of the outer ring 130 or the cracking on the outer ring 130, hence implementing the enhancement of the durability of the outer ring 130 and a toroidal type continuously variable transmission in which the outer ring 130 is incorporated.

Now, FIGS. 31 to 33 are views showing a second structure of the previous invention. Whereas the thrust needle bearing 127a is formed by the combination of two holders, that is, the main holder 139A and sub-holders 40A, in the case of the first structural example, a thrust needle bearing 127b as shown in FIGS. 32 and 33 is formed by one holder 44 whose configuration is represented in FIG. 31.

The holder 44 comprises a plurality of pockets 41 and 41, each formed in an elongated rectangular shape, on a base board 45 made of a metallic plate, a plate of synthetic resin, or the like. In a state that the holder 44 is installed between the outer side face of the outer ring 130 of the thrust ball bearing 126 and the inner side face of the trunnion 6, the outer circumferential edge 46 of the holder 44 becomes substantially coaxial with the pivot portion 22 that forms the displacement shaft 7, while the inner circumferential edge 47 is substantially coaxial with the supporting shaft portion 121 that forms the displacement shaft 7.

Further, in accordance with the present structural example, each of the pockets 41 and 41 provided for the holder 44 is formed in a state that the longitudinal direction of the respective pockets 41 and 41 is identical to the radial direction centering on the point O on the central axis of the supporting shaft portion 121 that forms the displacement shaft 7. As a result, the axial directions of all the needles 133 and 133 held in each of the pockets 41 and 41 are identical to the radial direction centering on the point O described above.

When this toroidal type continuously variable transmission is operated, the power roller 8 (see FIGS. 6, 7, 25 and 26) is displaced by the swinging of the disks 2 and 4 on the input and output sides, electively (see FIGS. 6, 7 and 25) as well as by the elastic deformation of each of the structural members. Then, along this displacement, the relative displacement takes place between the outer side face of the outer ring 130 and the inner side face of the trunnion 6. At that time, the outer ring 130 swings centering on the supporting shaft portion 122. In the case of the present structural example, the axial directions of all the needles 133 and 133 are arranged in the directions perpendicular to the swinging direction of the outer ring 130. In other words, the axial directions of all the needles 133 and 133 that form the thrust needle bearing 127b are identical to the radial direction centering on the center O of the supporting shaft portion 121. Therefore, unlike the first structural example described earlier, there is no sliding friction occurring between the rolling surface of the respective needles 133 and 133 and the surface of its counterpart when the outer ring 130 swings. In other words, in accordance with the present structural example, the contact between the rolling surface of the respective needles 133 and 133, and the surface of its counterpart is in a state of rolling contact almost 100%. As a result, compared to the first structural example, it is possible to perform the relative displacement between the outer side face of the outer ring 130 and the inner side face of the trunnion 6 more smoothly.

In this respect, it is a prerequite for the toroidal type continuously variable transmission of the previous invention that a 70% or more of the pitch circle a of the balls 129 and 129 that form the thrust ball bearing 126 is superposed with the load receiving portion. With the superposition of 70% or more, it is possible to obtain an excellent durability as compared to the conventional structure, not necessarily by the 100% superposition as in the cases of the first and second structural examples represented in the respective figures. If the superposition is 100%, the durability is more enhanced, of course, as compared to the 70% superposition. Also, of the plural needles 133 and 133 that form the thrust needle bearing 127, those for which the pitch between the adjacent needles 133 and 133 is made a 5% or less of the circumferential length of the pitch circle a should be within the load receiving portion where the superposition of 70% or more are secured. If only the 70% superposition is obtained in this manner, it is possible to implement the enhancement of the durability as compared to the conventional structure even in a case where the pitches on the remaining portion (the portion where the superposition is 30% or less of the circumferential length) may exceed the 5% described above. However, it is preferable to set the pitches at 5% or less of the circumferential length all over the entire length in order to implement the further enhancement of the durability.

With the toroidal type continuously variable transmission of the previous invention as has been described above, the durability and reliability of the toroidal type continuously variable transmission structured including the outer ring 130 can be implemented by the enhancement of the durability of the outer ring 130 that constitutes the thrust ball bearing 126. Nevertheless, in order to enhance the durability more, it is necessary to consider enhancing the durability of the needles 133 and 133 for the reasons given below.

In other words, the previous invention gives a serious consideration to the durability of the outer ring 130 that forms the thrust ball bearing 126 of the toroidal type continuously variable transmission described above, but no particular consideration is given to the durability of the components that constitute the thrust needle bearing 127. More specifically, there is a possibility that the needles 133 and 133 held by the pockets 41 and 41 of the holder 139A are off the inner side face of the trunnion 6, because no mechanism is provided for regulating the amount of displacement of the holders 139A and 44 that constitute the thrust needle bearing 127. If the needles 133 and 133 are off the inner side face of the trunnion 6, the rolling surface of the needles 133 and 133 partly abuts upon the edge of the raceway surface that receives thrust, so that an excessive surface pressure acts upon such part of the rolling surface ultimately causing fatigue. As a result, the life of the rolling surface is affected. Also, if such pressure is conspicuous, it is conceivable that the needles 133 and 133 fall off from the pockets 41 and 41 in some cases.

In the case of the previous invention described in conjunction with FIGS. 30 to 33, the outer diameter of the race 131A, which allows the rolling surface of each of the needles 133 and 133 to be in contact, is made larger than the width of the trunnion 6 (the dimension in the direction from left to right in FIGS. 30 and 33), thus preventing the needles from falling off. However, it is impossible to prevent the needles 133 and 133 from being off the inner side face of the trunnion 6. Accordingly, it is unable to prevent the excessive pressure from being exerted partly on the rolling surface of the needles 133 and 133. In other words, even when the race 131A faces the rolling surface of the needles 133 and 133, an excessive surface pressure acts upon the rolling surface opposite to the edge portion of the trunnion 6 unless the race 131A is backed up by means of the inner side face of the trunnion 6.

As described above, even if the dimension of the outer diameter of the race 131A is made larger than the width dimension of the trunnion 6, it is insufficient to produce an effect on preventing an excessive surface pressure from acting upon the rolling surface of the needles 133 and 133. Also, for the reduction of material costs for the race 131A, as well as the reduction of its weight, and also, in consideration of preventing the interference between the outer circumferential edge of the race 131A protruded from both ends in the width direction of the trunnion 6, and the other constituents, it is preferable to arrange the configuration of the race 131A to be identical to the configuration of the inner side face of the trunnion 6. Then, in such case, the structure should be arranged so as to prevent not only the excessive surface pressure from being exerted on the rolling surface of the needles 133 and 133, but also, reliably prevent the needles 133 and 133 from falling off the pockets 41 and 41. A toroidal type continuously variable transmission of the present invention is designed in consideration of these situations.

SUMMARY OF THE INVENTION

In accordance with the present invention, toroidal type continuously variable transmission comprises:

first and second disks having respective circularly concave surfaces arranged to face each other, and rotatively supported coaxially relative to each other;

a power roller nipped between the first and second disks to rotate by contacting the concave surfaces of the first and second disks;

a trunnion being swingable centering on pivots orthogonal to the central axis of the first and second disks, and having a circular hole penetrating in the direction perpendicular to the pivots;

a displacement shaft provided with first and second shaft portions being parallel and eccentric to each other, the first shaft portion being fitted into the circular hole and the second shaft portion supporting the power roller rotatively;

a thrust ball bearing for bearing thrust load exerted on the power roller and allowing the power roller to rotate;

a thrust needle bearing arranged between the outer ring of the thrust ball bearing and the trunnion for bearing thrust load exerted by the power roller on the outer ring of the thrust ball bearing, and allowing the second shaft portion and the outer ring of the thrust ball bearing to swing centering on the first shaft portion, at the same time, being provided with pockets rotatively supporting a plurality of needles and a holder having a circular through hole formed to face the aperture of the circular hole of the trunnion; and a radial needle bearing arranged between the first shaft portion and the circular hole to rotatively support the first shaft portion with respect to the trunnion. For this toroidal type continuously variable transmission, the inner surface where the radial needle bearing is arranged is made substantially flat; the outer ring of the radial needle bearing is arranged to protrude in the axial direction from the inner surface where the circular hole is provided; and the through hole of the holder is fittingly coupled with the protruded outer ring.

Particularly, for this toroidal type continuously variable transmission, the portion on the inner side face of the trunnion where the thrust needle bearing is arranged is formed to be flat including the circumferential edge of the aperture of the circular hole. Also, the radial needle bearing is cylindrical and fittingly fixed to the inner side of the circular hole, and the length of the outer ring of the radial needle bearing is larger than the dimension of the circular hole in the axial direction. Also, the thrust needle bearing includes pockets holding a plurality of needles rotatively, and a holder having a circular through hole facing the aperture of the circular hole. Also, the holder is positioned with respect to the trunnion by inserting one end of the outer ring of the radial needle bearing in the axial direction into the inner side of the through hole.

In accordance with the toroidal type continuously variable transmission of the present invention structured as described above, no extrusion is present on the inner side face of the trunnion. Therefore, it is possible to process this inner side face by use of a tool having a large outer diameter. Hence the processing of the inner side face of the trunnion can be performed efficiently. Also, the holder is positioned with respect to the trunnion through the outer ring of the radial needle bearing by means of the engagement between the through hole and the end portion of the outer ring of the radial needle bearing. As a result, it is possible to reliably position the holder with respect to the trunnion even without any extrusion that should otherwise be arranged on the inner side face of the trunnion.

Also, a toroidal type continuously variable transmission of the present invention comprises:

first and second disks having respective circular concave surfaces arranged to face each other, and rotatively supported coaxially relative to each other;

a power roller nipped between the first and second disks to rotate by contacting the concave surfaces of the first and second disks;

a trunnion being swingable centering on pivots orthogonal to the central axis of the first and second disks, and provided with a circular hole penetrating in the direction rectangular to the pivots;

a displacement shaft provided with first and second shaft portions being parallel and eccentric to each other, the first shaft portion being fitted into the circular hole and the second shaft portion supporting the power roller rotatively;

a thrust ball bearing for bearing thrust load exerted on the power roller and allowing the power roller to rotate; and a thrust needle bearing arranged between the outer ring of the thrust ball bearing and the trunnion for bearing thrust load exerted by the power roller on the outer ring of the thrust ball bearing, and allowing the second shaft portion and the outer ring of the thrust ball bearing to swing centering on the first shaft portion. For this toroidal type continuously variable transmission, further arrangement is made as given below:

(a) when a load receiving portion capable of bearing thrust load by means of a plurality of needles constituting the thrust needle bearing, and the pitch circle of the thrust ball bearing are superposed in the axial direction of the second shaft portion, 70% or more of the circumferential length of the pitch circle is included in the load receiving portion;

(b) among the plurality of needles of the thrust needle bearing, the needles existing in the load receiving portion corresponding at least to 70% or more of the circumferential length are arranged so as to set the pitch between adjacent needles at 5% or less of the circumferential length of the pitch circle of the thrust ball bearing even at the maximum; and (c) the thrust needle bearing is provided with a holder for holding the plurality of needles, and means for regulating the angle of swinging displacement of the holder centering on the first shaft portion between the holder and the trunnion.

Also, in accordance with the present invention, a toroidal type continuously variable transmission satisfies all the following conditions (a) and (b) in the same way as the toroidal type continuously variable transmission of the previous invention:

(a) when a load receiving portion capable of bearing thrust load by means of a plurality of needles constituting the thrust needle bearing, and the pitch circle of the thrust ball bearing are superposed in the axial direction of the pivot portion, 70% or more of the circumferential length of said pitch circle is included in the load receiving portion; and (b) among the plurality of needles of the thrust needle bearing, the needles existing in the load receiving portion corresponding at least to 70% or more of the circumferential length are arranged so as to set the pitch between adjacent needles at 5% or less of the circumferential length of the pitch circle of the thrust ball bearing even at the maximum.

These conditions (a) and (b) should of course be satisfied irrespective of any relative displacement of the trunnion and the outer ring.

Particularly, a toroidal type continuously variable transmission of the present invention satisfies the following condition (c):

(c) the thrust needle bearing is provided with a holder supporting all the needles rotatively, and between this holder and the trunnion, an irregular coupling portion is arranged to regulate the swinging angle of the holder centering on the supporting shaft portion.

Further, a toroidal type continuously variable transmission of the present invention makes the axial direction of all the needles constituting the thrust needle bearing identical to the radial direction centering on the supporting shaft portion.

Further, a toroidal type continuously variable transmission of the present invention forms respectively a recessed portion having a given width dimension in the intermediate section of the inner side face of the bending portion folded from the end of the trunnion toward the installation side of the power roller, and an extrusion on a portion of the end edge of the holder corresponding to the aforesaid folded bending portion, this extrusion having a width dimension smaller than the given width dimension of the recessed portion, and protruding from the aforesaid end edge. This extrusion is caused to enter the inner side of the recess for the formation of the irregular coupling portion referred to in the preceding condition (c). The portion on the inner side face of the trunnion corresponding to the aforesaid recess is arranged to protrude to the power roller side more than the portion on the inner side face where a plurality of needles constituting the thrust needle bearing face or contact.

The toroidal type continuously variable transmission of the present invention as structured above transmits rotational force by the same action as the conventional toroidal type continuously variable transmission described earlier, and further, it changes the ratio of rotational speeds. Also, as in the toroidal type continuously variable transmission of the previous invention, the outer ring that forms the thrust ball bearing is backed up in a wide range (70% or more of the circumferential length of the pitch circle). As a result, even when thrust load is applied, any great bending stress is not easily exerted on the outer ring. Damages such as peeling off and cracks are not easily caused to the outer ring, either. Hence it is possible to implement the enhancement of the durability of the toroidal type continuously variable transmission.

Particularly, in accordance with the toroidal type continuously variable transmission of the present invention, the swinging angle of the holder is regulated by means of the irregular coupling portion arranged between the trunnion and holder. Therefore, it is possible to prevent the needles that constitute the thrust needle bearing from being off the surface of the thrust raceway, and also to, prevent any damage to the rolling surface of the needles that may take place if the rolling surface should abut upon the edge of the surface of the thrust raceway. Further, any possible falling off of the needles from the pockets can be prevented reliably. In this respect, the contact between the rolling surface of each needle and its counterpart should bring about the inclusion of sliding contact. Then, the friction loss should become greater in the portion of the thrust needle bearing. Then the displacement of the outer ring of the thrust ball bearing cannot be performed smoothly. As a result, the efficiency of the toroidal type continuously variable transmission is lowered. However, the rolling surface and its counterpart are in the state of contact almost 100% between them, thus making the friction loss smaller in the portion of the thrust needle bearing. In this way, the displacement of the outer ring of the thrust ball bearing is performed smoothly in order to enhance the efficiency of the toroidal type continuously variable transmission, and then, the processing can be performed efficiently with respect to the portion having an area wider than the portion opposite to the aforesaid recess. This portion is where a plurality of needles face or contact. The reasons why such efficient processing is possible will be described later in detail.

DETAILED DESCRIPTION OF THE PREFERRED EMBODIMENTS

Hereinafter, with reference to the accompanying drawings, the detailed description will be made of the embodiments in accordance with the present invention. In this respect, the same reference marks designate the same members and portions throughout the accompanying drawings.

FIGS. 1 to 5 are views showing a first embodiment. The features of the first embodiment of the present invention provide a structural portion that makes it easy to perform the processing of the inner side face of a trunnion 6, while implementing the positioning of a holder 26 of the trunnion 6 reliably (in accordance with the present embodiment represented in FIGS. 1 to 5, a holder 26 and a race 25 being positioned). The structures and functions of the other portions are the same as those of the conventional toroidal type continuously variable transmission described earlier.

Therefore, the description will be omitted or briefly made as to such portions. Hereunder, the present invention will be described centering on the characteristic aspects thereof.

Figure 8:
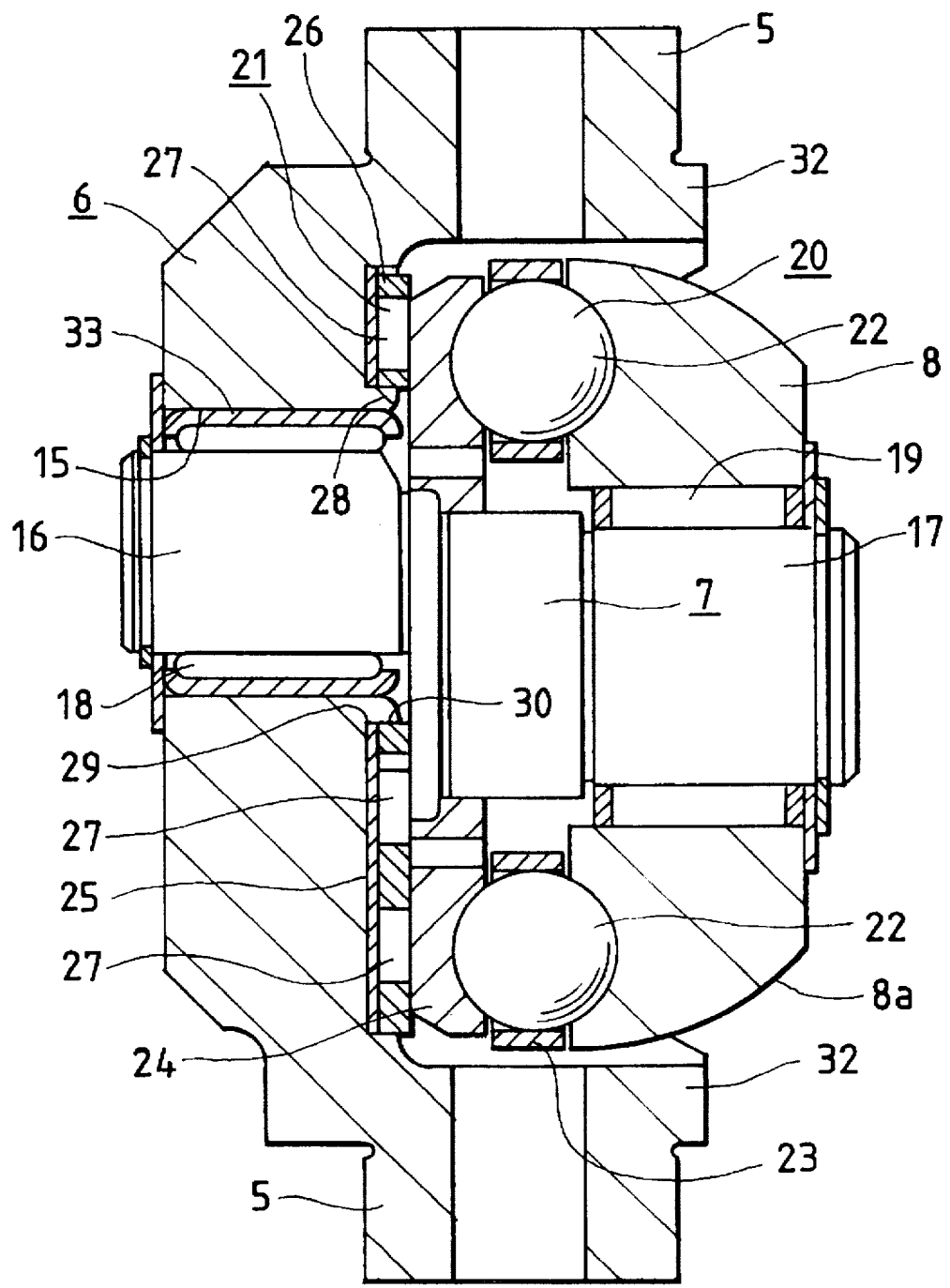
FIG. 8 is a cross-sectional view showing the conventional structure in a state that the power roller is incorporated in the trunnion.
Figure 9:
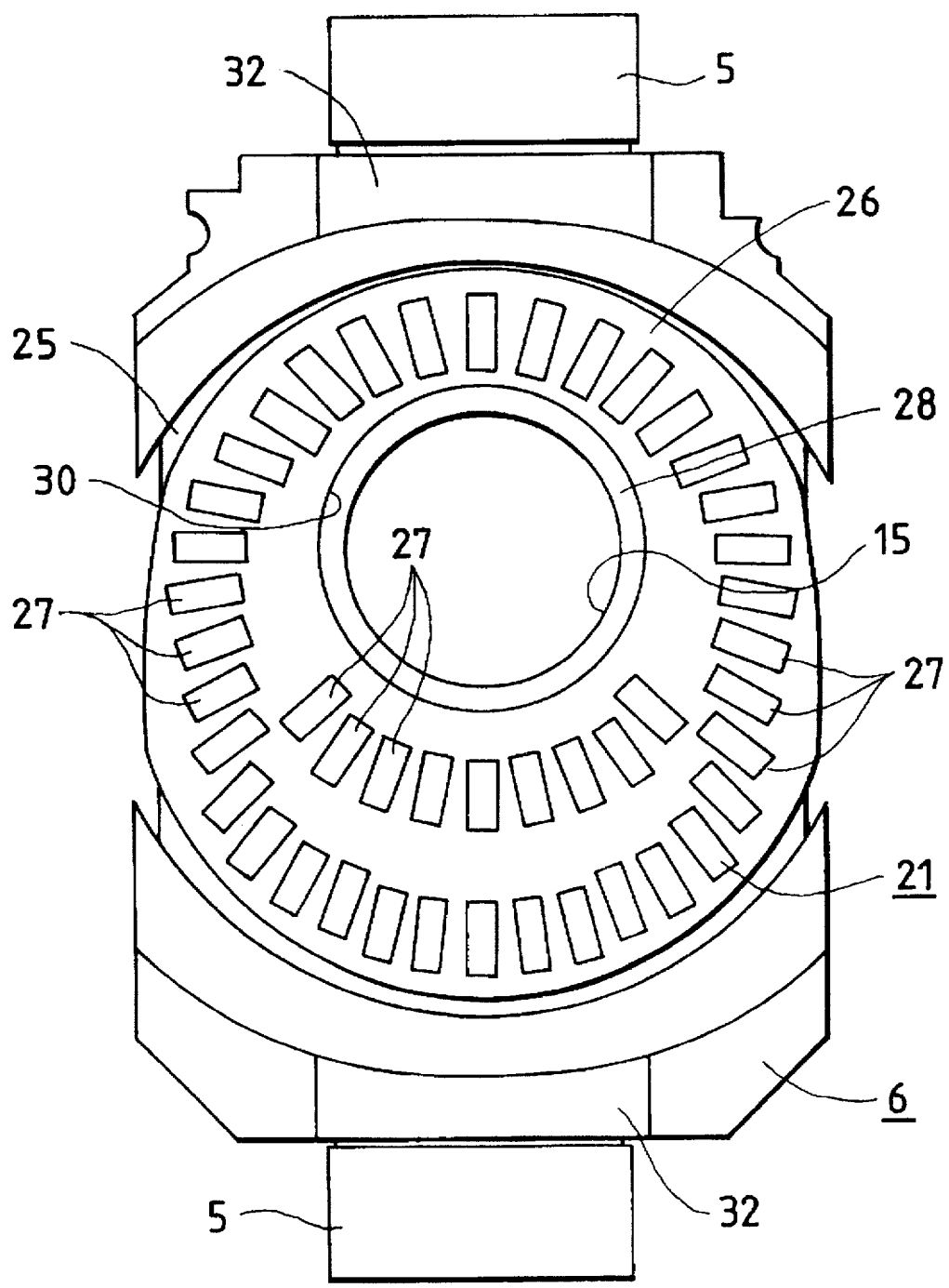
FIG. 9 is a view showing the structure represented in FIG. 8 by removing the power roller and thrust ball bearing, which is observed from the right-hand side of FIG. 8.
Figure 10:
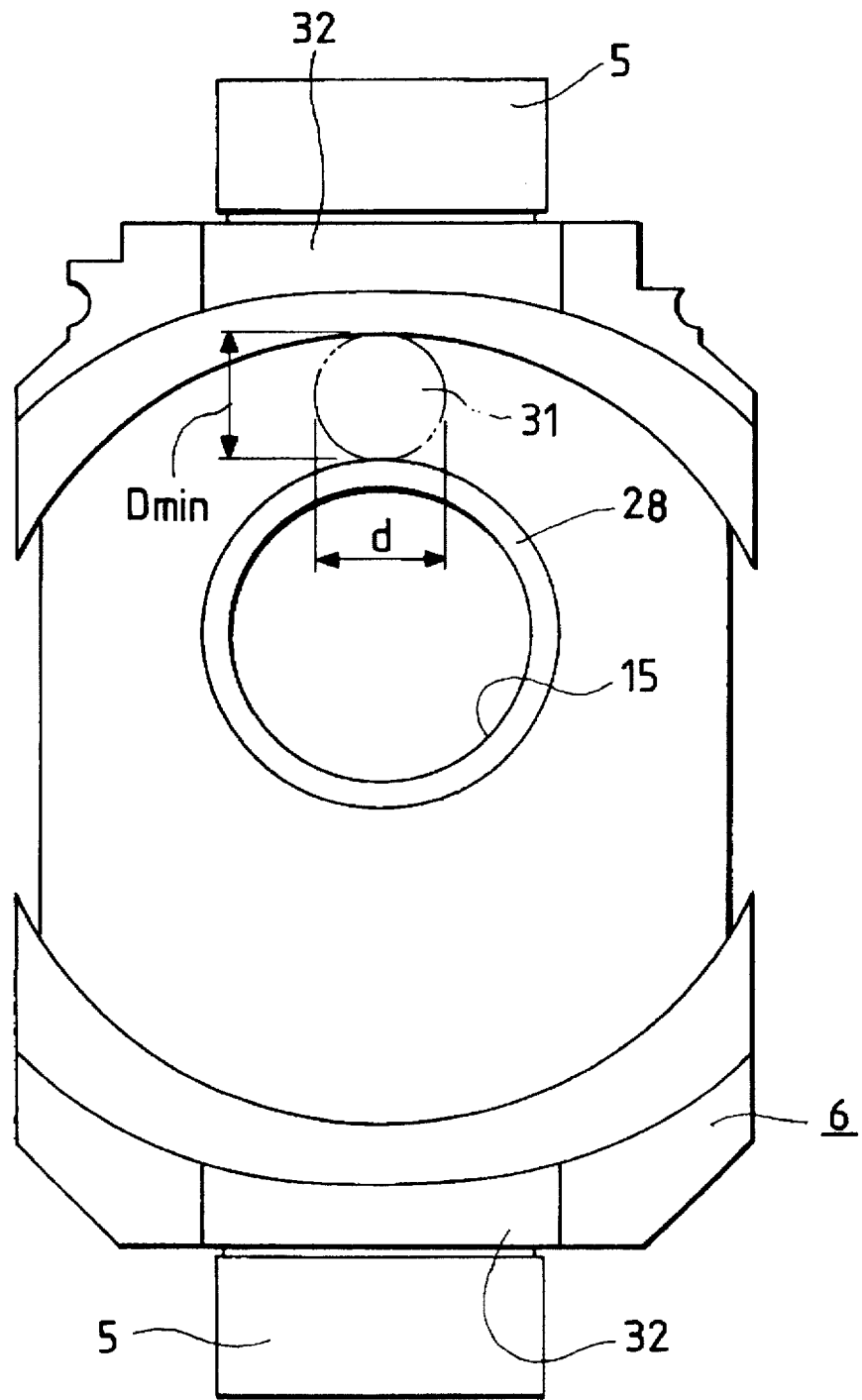
FIG. 10 is a view showing the structure represented in FIG. 9 by further removing the thrust needle bearing, which is observed from the right-hand side of FIG. 8.

The portion on the inner side face of the trunnion 6 where a thrust needle bearing 21 is arranged is formed to be flat including the circumferential edge of the aperture of a circular hole 15 that rotatively supports the supporting shaft portion 16 of a displacement shaft 7. In other words, on the inner side face of the trunnion 6 that constitutes the toroidal type continuously variable transmission of the present invention, there is no extrusion 28 (see FIGS. 8 to 10) which was provided for the conventional structure described earlier. Also, a radial needle bearing 18 is provided with a cylindrical outer ring 33 of the radial needle bearing. The longitudinal dimension of this outer ring 33 of the radial needle bearing is larger than the longitudinal dimension of the circular hole 15 in the axial direction, namely, $L_{33}$ ($>L_{15}=T_6$) where $L_{15}$ (=the thickness $T_6$ of the central part of the trunnion 6).

The outer ring 33 of the radial needle bearing is fittingly fixed to the inner side of the circular hole 15 without any play. Then, in the state of being fittingly fixed, one end of the outer ring 33 of the radial needle bearing (right end portion in FIG. 1) is protruded from the inner side face of the trunnion 6 by $h_{33}$. Also, the edge of the outer ring 33 of the radial needle bearing at the other end (edge at the left end side in FIG. 1) abuts upon the stopper ring 34 that engages with the end portion of the supporting shaft portion 16, hence positioning it on the same plane as the outer side face of the trunnion 6. In this state, the longitudinal dimension $L_{33}$ (=$T_6+h_{33}$) of the outer ring 33 of the radial needle bearing is regulated so that the amount $h_{33}$ of the protrusion described above is made larger than the thickness dimension $t_{25}$ of the race 25, and smaller than the sum of the thickness dimension $t_{25}$ of the race and the thickness dimension $t_{26}$ of the holder 26, that is, $\{t_{25}<h_{33}<(t_{25}+t_{26})\}$.

The thrust needle bearing 21 comprises each one of the race 25 and the holder 26, and a plurality of needles 27 and 27. On a part of the race 25, that is, a portion where it faces the aperture of the circular hole 15 formed on the trunnion 6, a through hole 35 is formed. Also, for the holder 26, there is formed a through hole 37 similar to the through hole 35 formed on the race 25 in addition to pockets 36 and 36 that hold each of the needles 27 and 27 rotatively. The inner diameter of each of the through holes 35 and 37 is made slightly larger than the outer diametral dimension of the outer ring 33 of the radial needle bearing. Therefore, in a state that the outer ring 33 of the radial needle bearing, the race 25, and the holder 26 are incorporated on the trunnion 6, one end of the outer ring 33 of the radial needle bearing in the axial direction is inserted into the inner sides of the through holes 35 and 37. In this way, the positioning of the race 25 and the holder 26 is implemented with respect to the trunnion 6.

Figure 1:
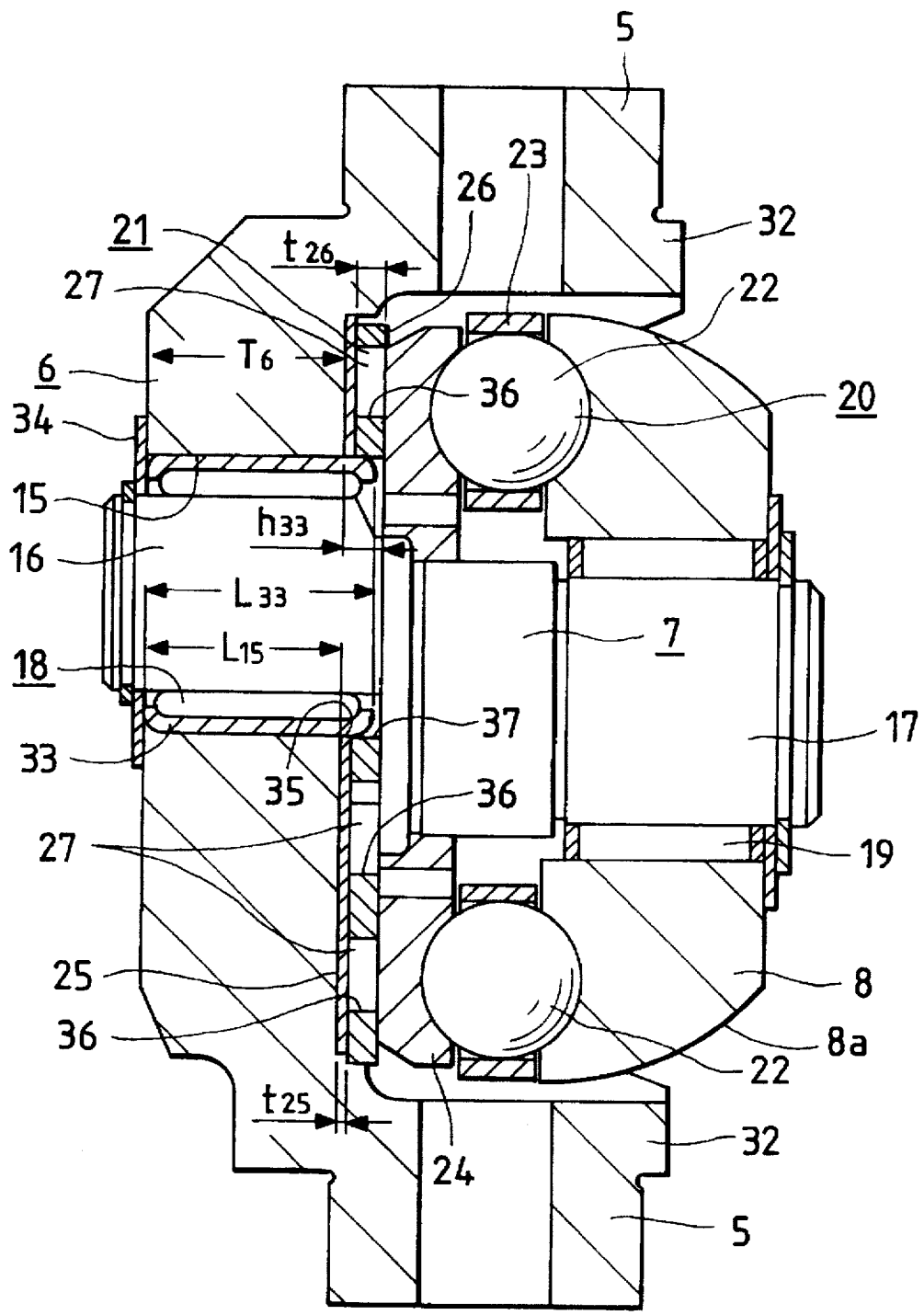
FIG. 1 is a cross-sectional view showing a first embodiment of the present invention in a state where a power roller is incorporated in a trunnion.
Figure 2:
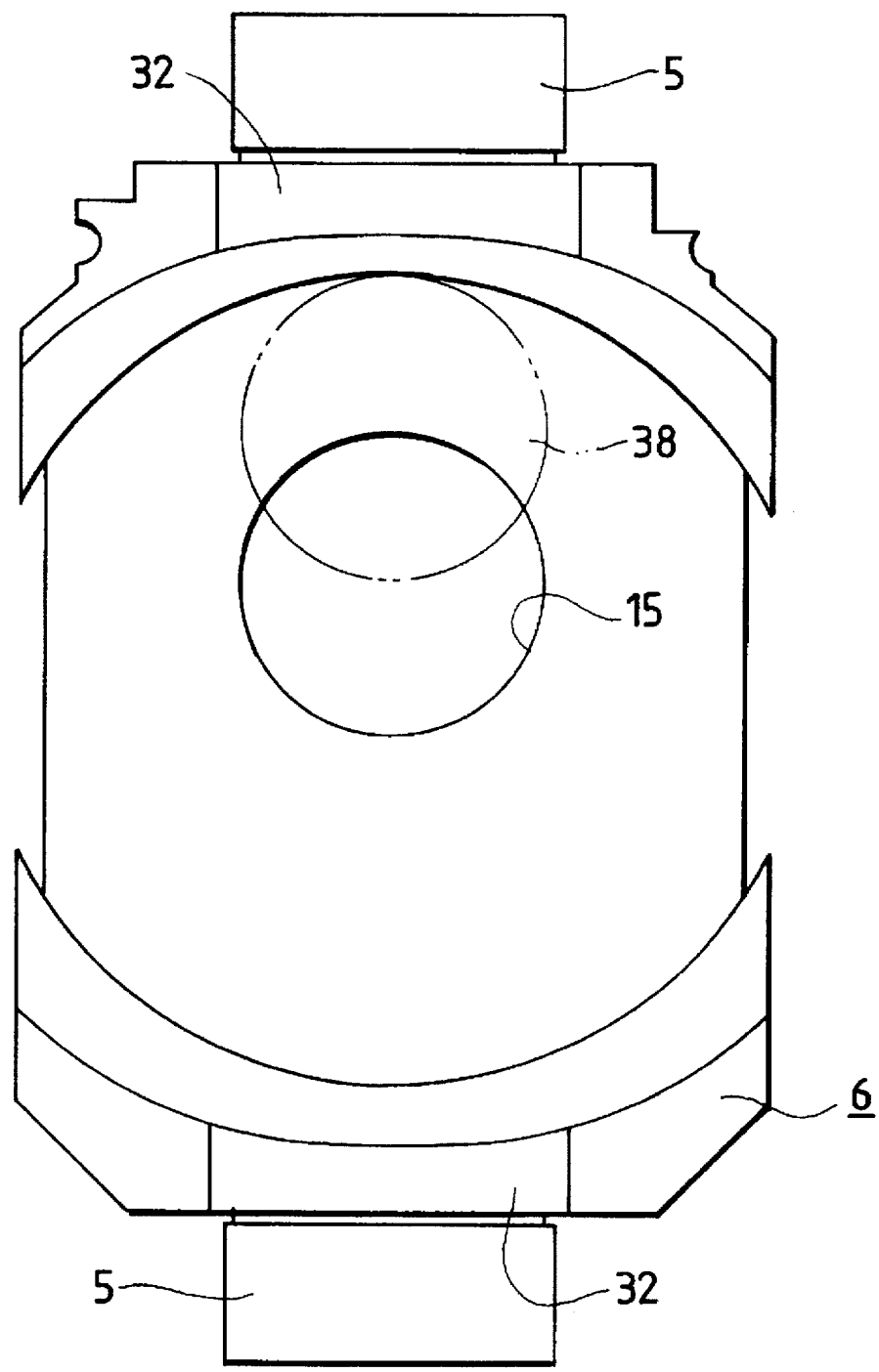
FIG. 2 is a view showing the structure represented in FIG. 1 from which only the trunnion is drawn, and observed from the right-hand side of FIG. 1.
Figure 3:
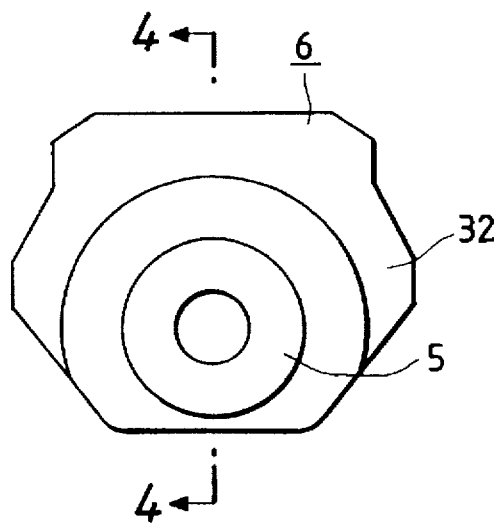
FIG. 3 is a view showing the trunnion represented in FIG. 2, observed from the top.
Figure 4:
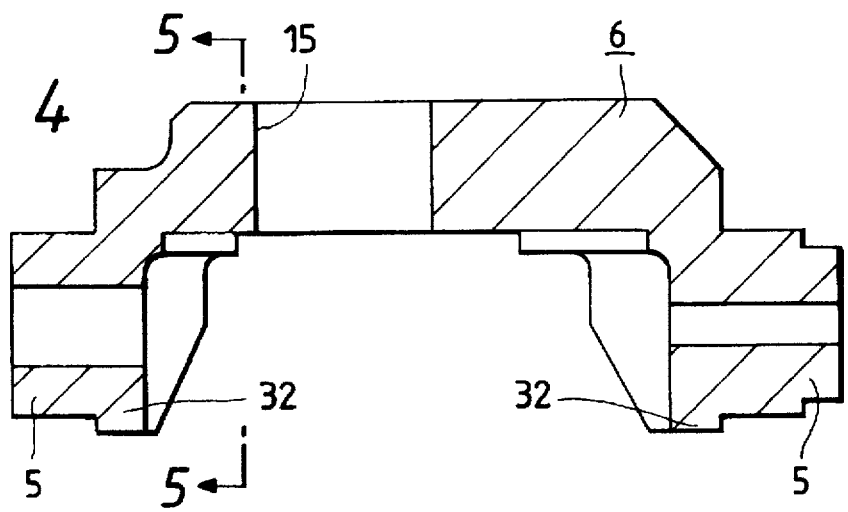
FIG. 4 is a cross-sectional view taken along line 4—4 in FIG. 3.
Figure 5:
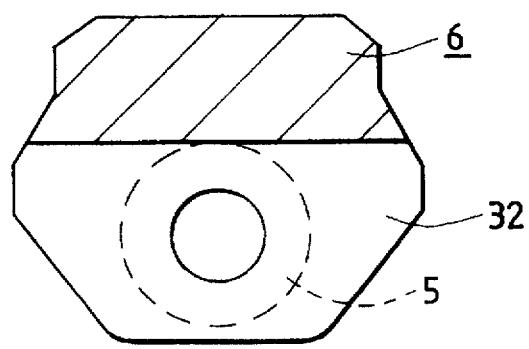
FIG. 5 is a cross-sectional view taken along line 5—5 in FIG. 4.

In accordance with the toroidal type continuously variable transmission of the present invention as described above, the extrusion 28 (see FIGS. 8 to 10) which is provided for the conventional structure is not present on the inner side surface of the trunnion 6. Therefore, it becomes possible to process this inner side face by use of a tool having a large outer diameter. In other words, as is clear from FIGS. 1, 2, 4, and 5, the portion where the race 25 is attached for installation is flat entirely with the exception of the aperture of the end portion of the circular hole 15, that is, there is no extruded portion in the intermediate section of the surface that should be processed. Consequently, as shown in FIG. 2, the inner side face can be processed by use of a tool 38 having a large outer diametral dimension. There is no problem even when a part of the rotational cutting tool 38 is projected over the aperture of the circular hole 15. Therefore, it is possible to process the inner side face of the trunnion 6 efficiently as compared to the processing of the inner side face of the conventional structure as described earlier, which necessitates the use of a tool 31 having a small outer diametral dimension (see FIG. 10).

Also, the race 25 and holder 26 are positioned with respect to the trunnion 6 by the engagement between the circular through holes 35 and 37 formed respectively on each of them, and the end portion of the outer ring 33 of the radial needle bearing through the outer ring 33 of the radial needle bearing. As a result, it is possible to position the race 25 and holder 26 reliably with respect to the trunnion 6 even without any extrusion 28 (see FIGS. 8 to 10) provided for the inner side face of the trunnion 6.

Since the toroidal type continuously variable transmission of the present invention is structured to function as described above, the processing efficiency of the trunnion can be enhanced, while implementing the positioning of the constituents thereof reliably, hence making it possible to reduce the manufacturing costs of the trunnion and the toroidal type continuously variable transmission in which such trunnion is incorporated.

FIGS. 11 to 15 are views showing a second embodiment in accordance with the present invention. In this respect, the features of the present invention are that an irregular coupling portion is arranged between a holder 48 and a trunnion 6 in order to prevent the needles 133 and 133 that constitute a thrust needle bearing 127c from being projected from a race 131B attached to the inner side face of the trunnion 6. Here, the race is attached in such a way that it is not allowed to project from the inner side face. The structures and functions of many other aspects are the same as those of the previous invention. Therefore, the description will be omitted or briefly made as to such aspects. Hereunder, the present invention will be described centering on the characteristic portions thereof.

Figure 25:
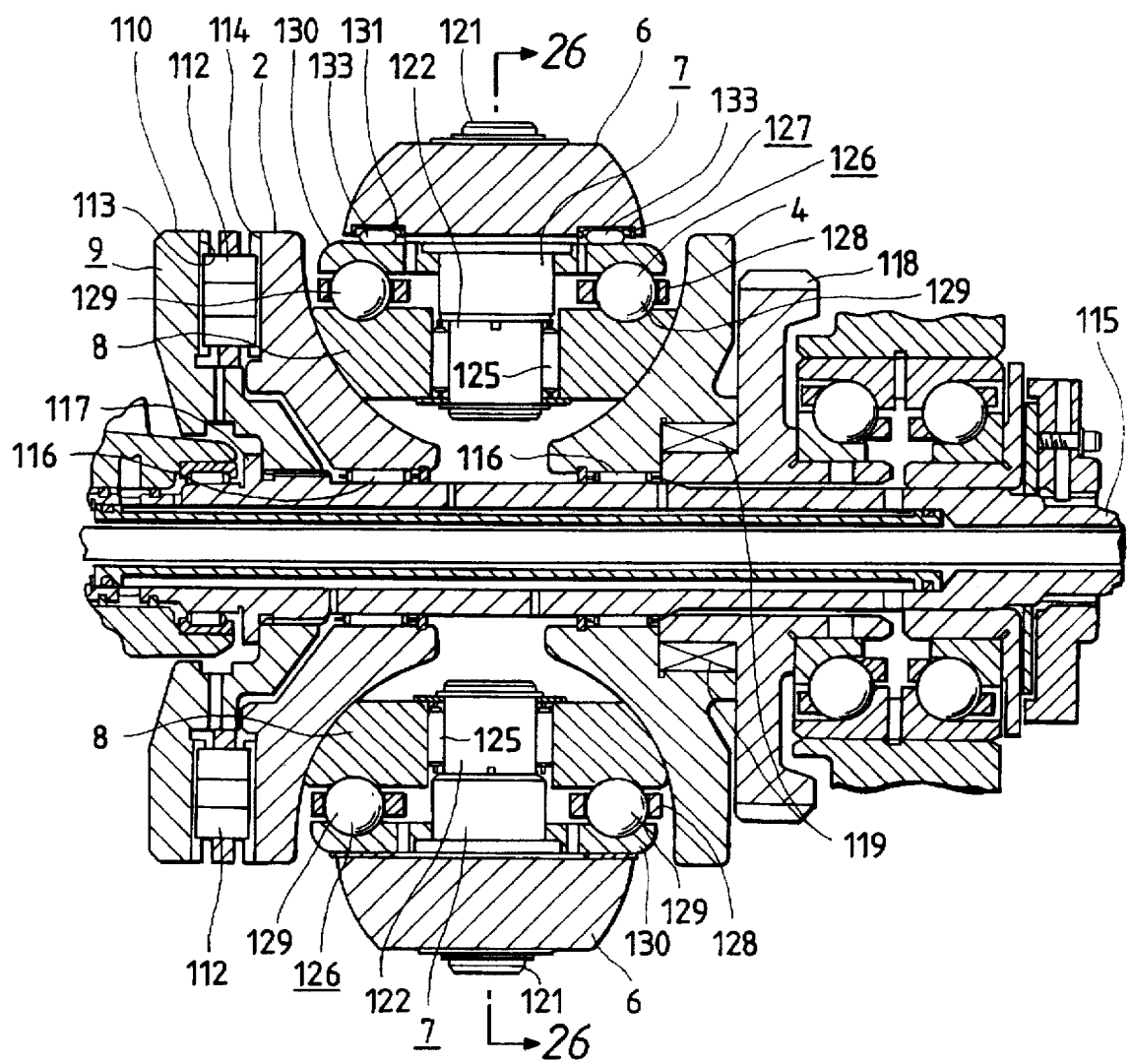
FIG. 25 is a cross-sectional view showing one example of the specific structure in accordance with the prior art.
Figure 26:
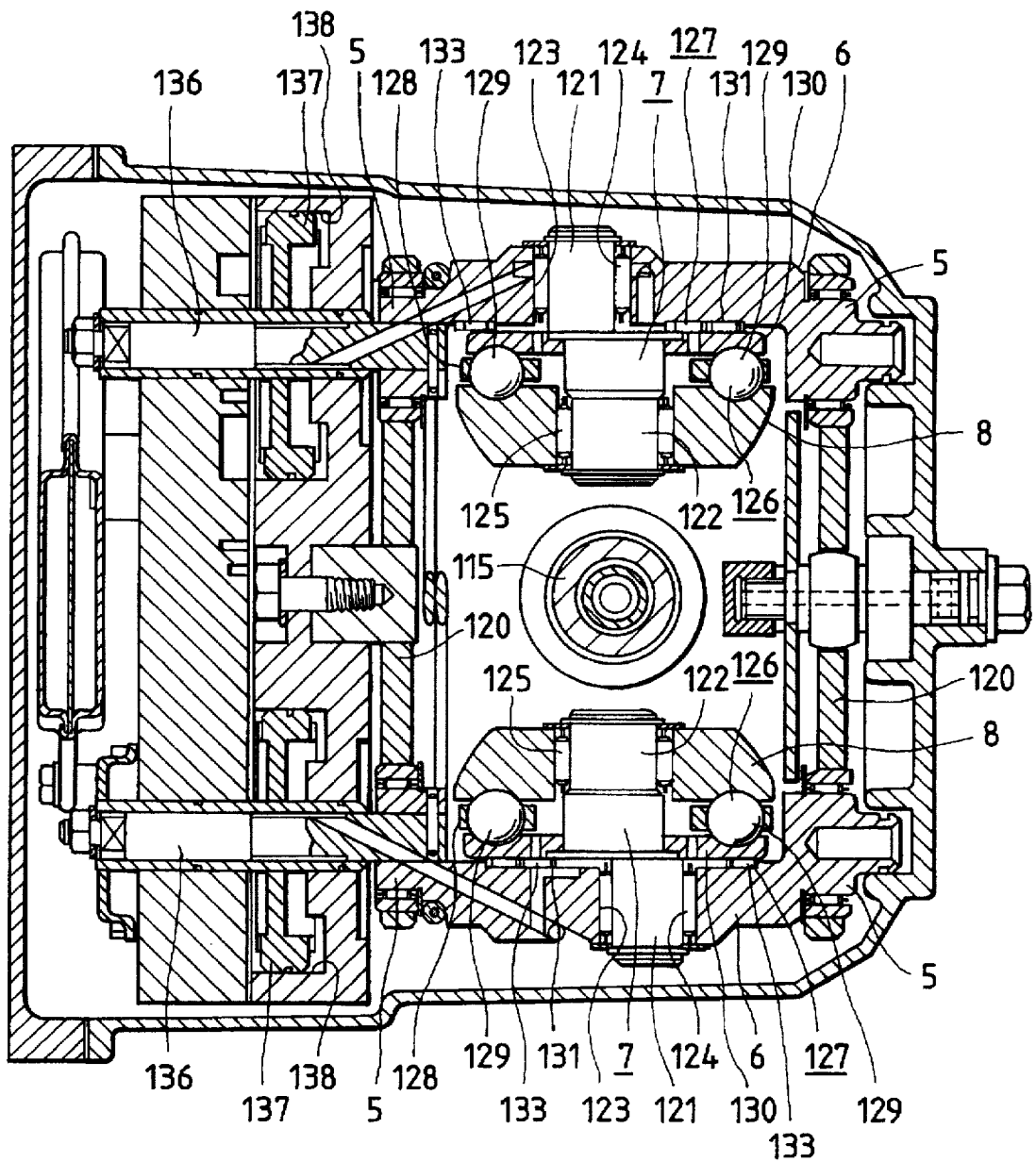
FIG. 26 is a cross-sectional view taken along line 26—26 in FIG. 25.
Figure 27:
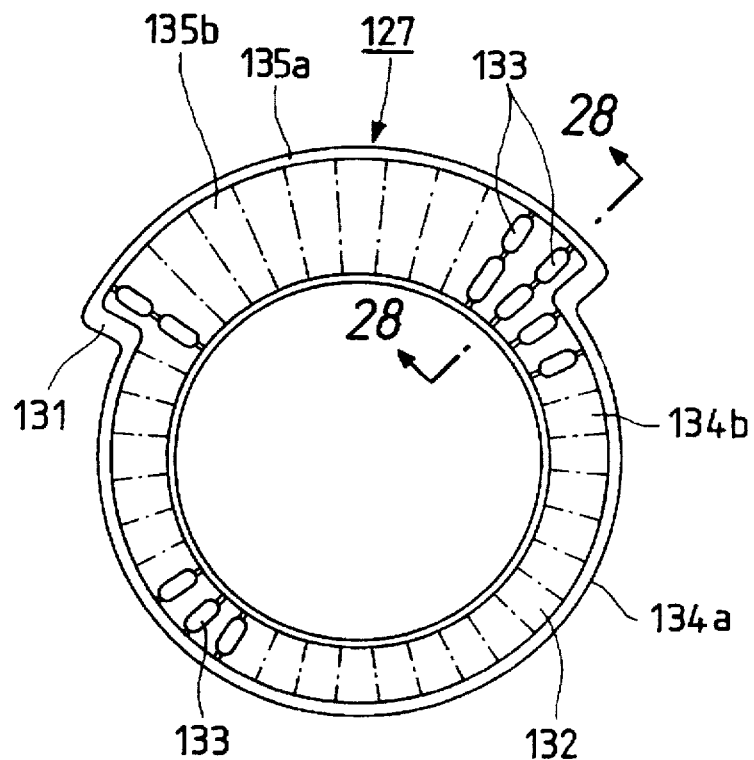
FIG. 27 is a view showing the thrust needle bearing incorporated in the structure in accordance with the prior art, which is observed in the same direction as FIG. 11.
Figure 28:
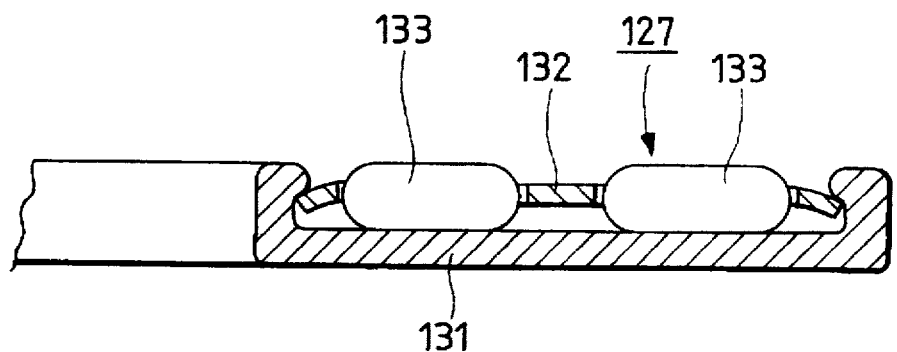
FIG. 28 is an enlarged sectional view taken along line 28—28 in FIG. 27.
Figure 29:
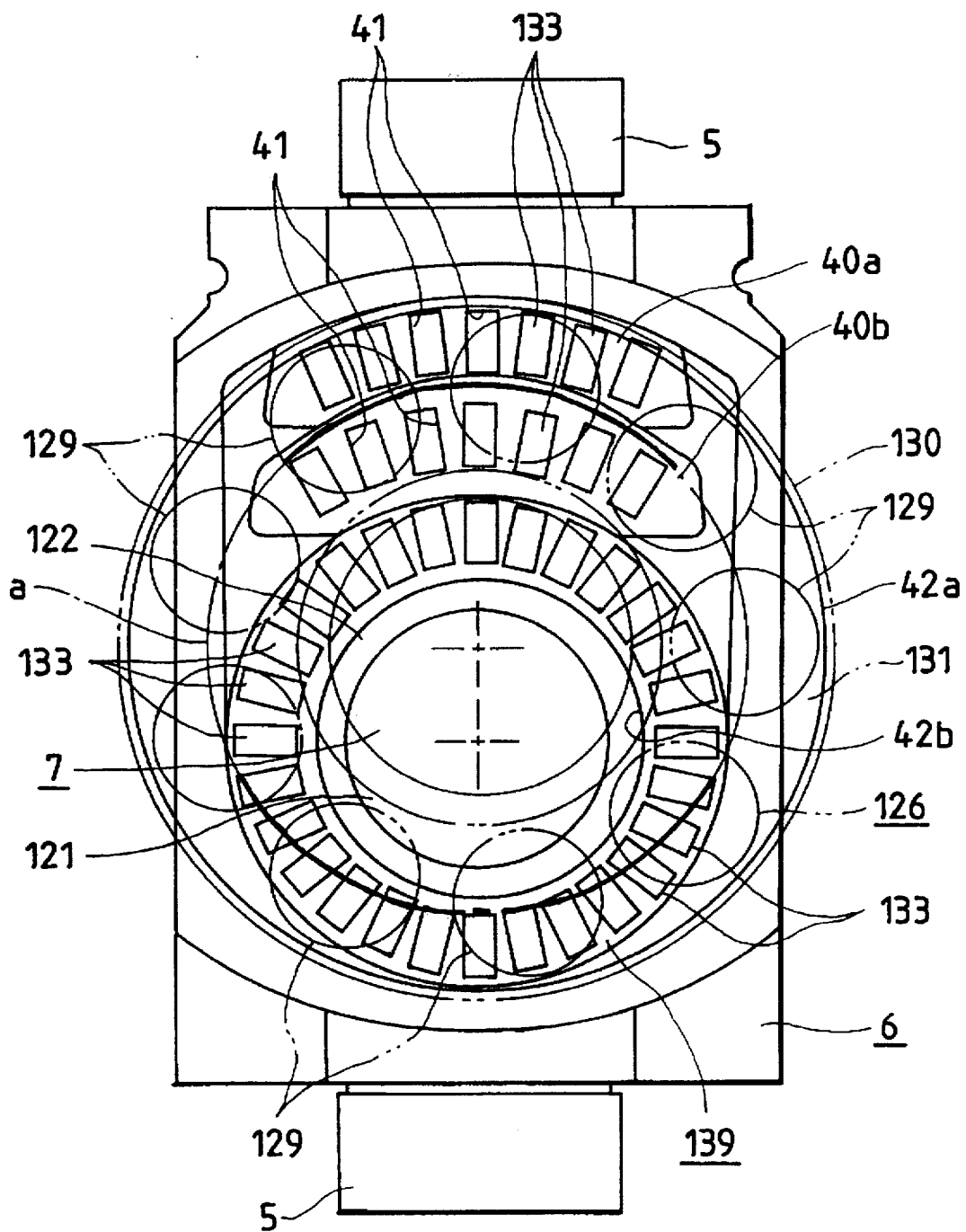
FIG. 29 is a view showing the thrust needle bearing manufactured in accordance with the prior art in preparation for the durability test to be conducted.
Figure 30:
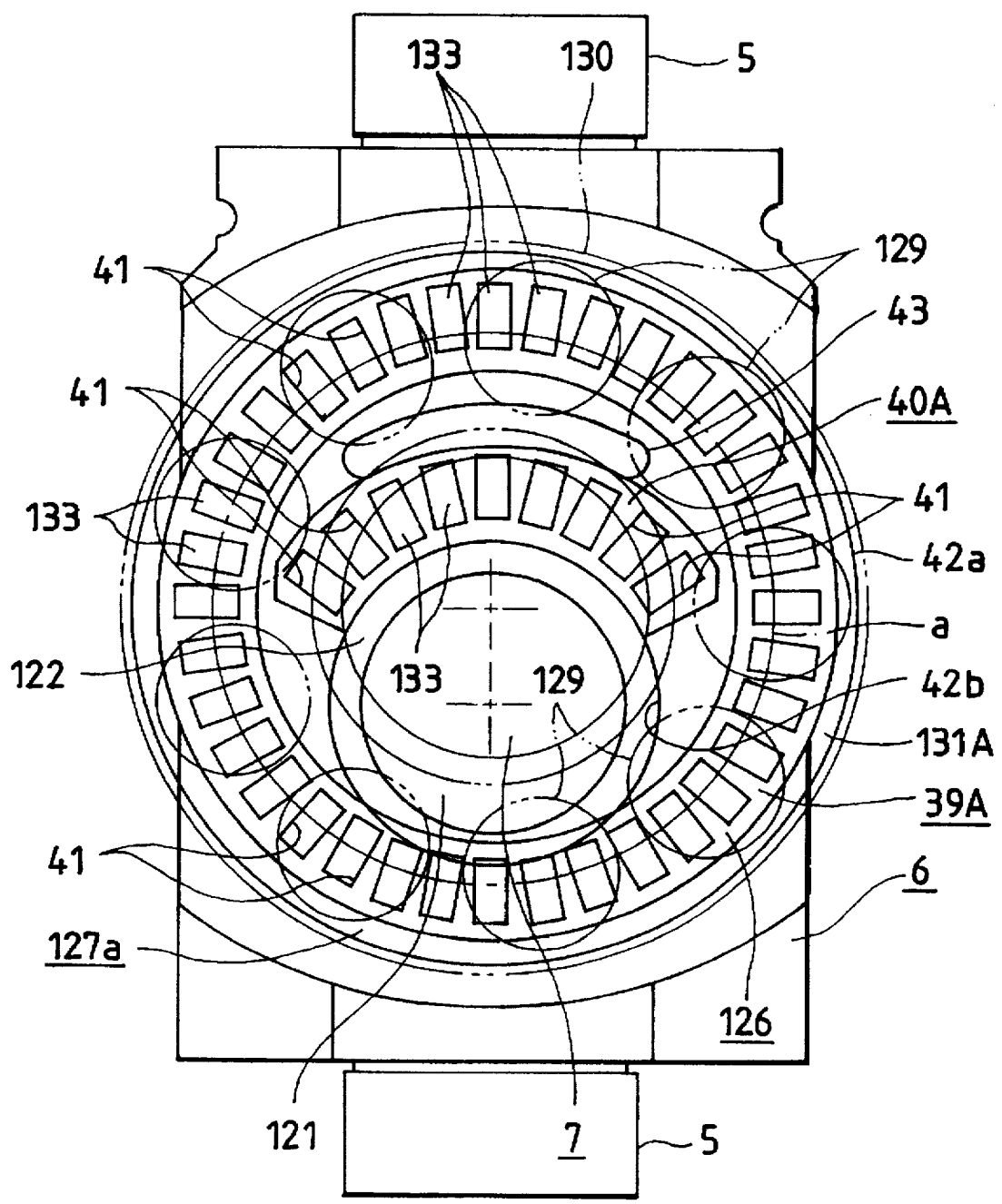
FIG. 30 is a perspective view showing the inner side face portion of the trunnion having the thrust ball bearing and thrust needle bearing incorporated thereon in accordance with a first structural example of the previous invention.
Figure 31:
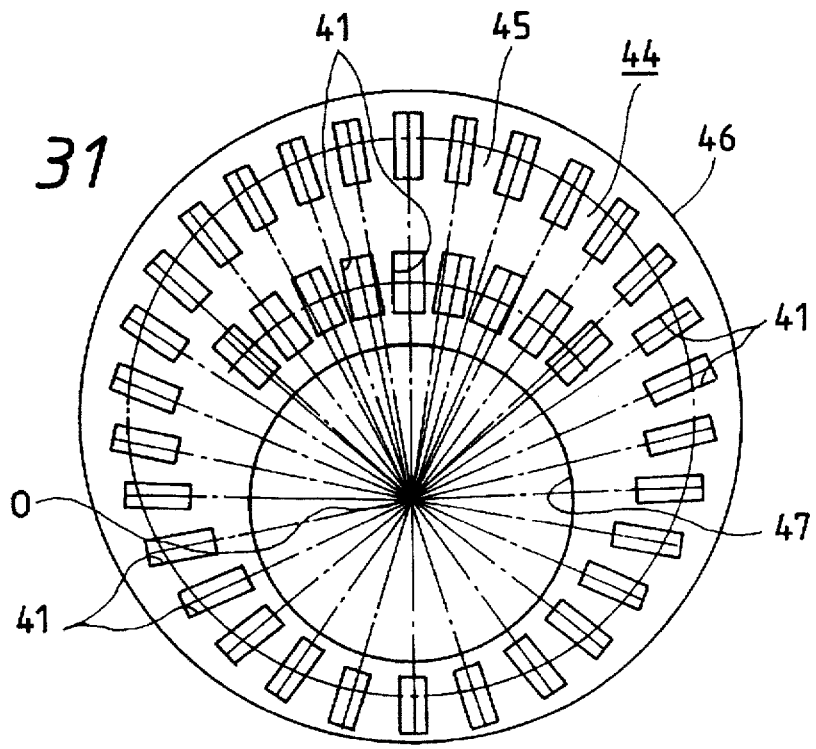
FIG. 31 is a view showing the holder used for a second structural example of the previous invention, which is observed in the same direction as FIG. 30.
Figure 32:
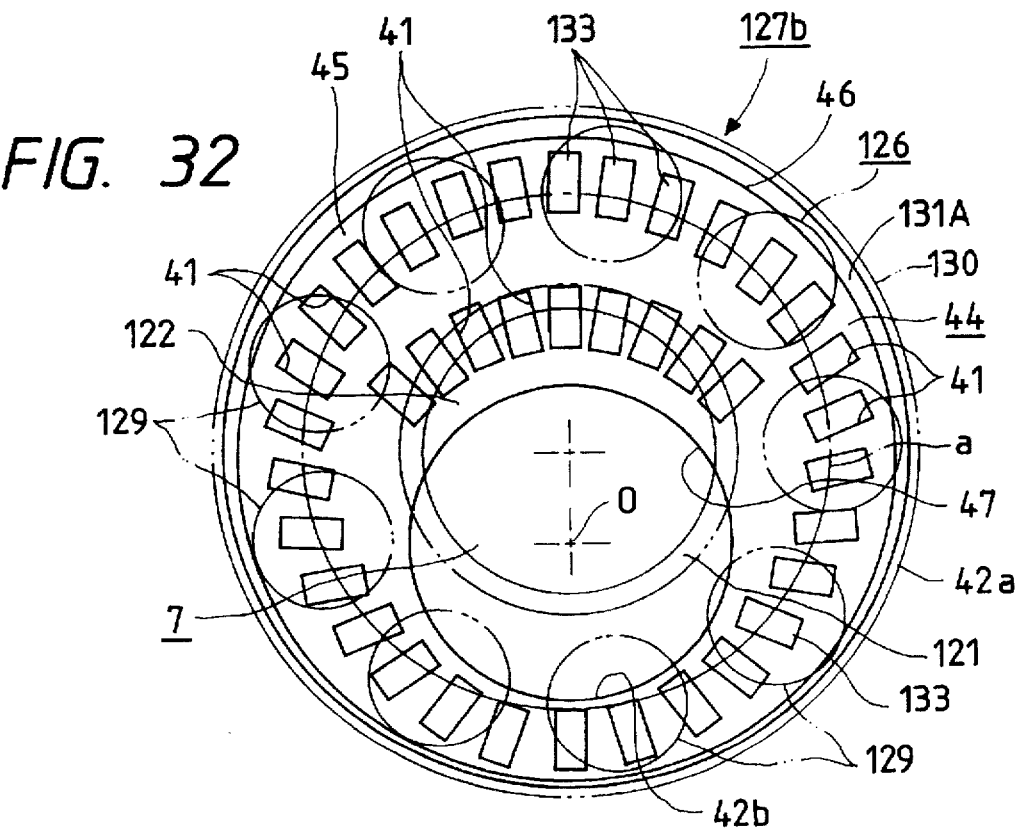
FIG. 32 is a view showing a state where the holder is incorporated with the race, pivot, and thrust ball bearing, which is observed in the same direction as FIG. 30.
Figure 33:
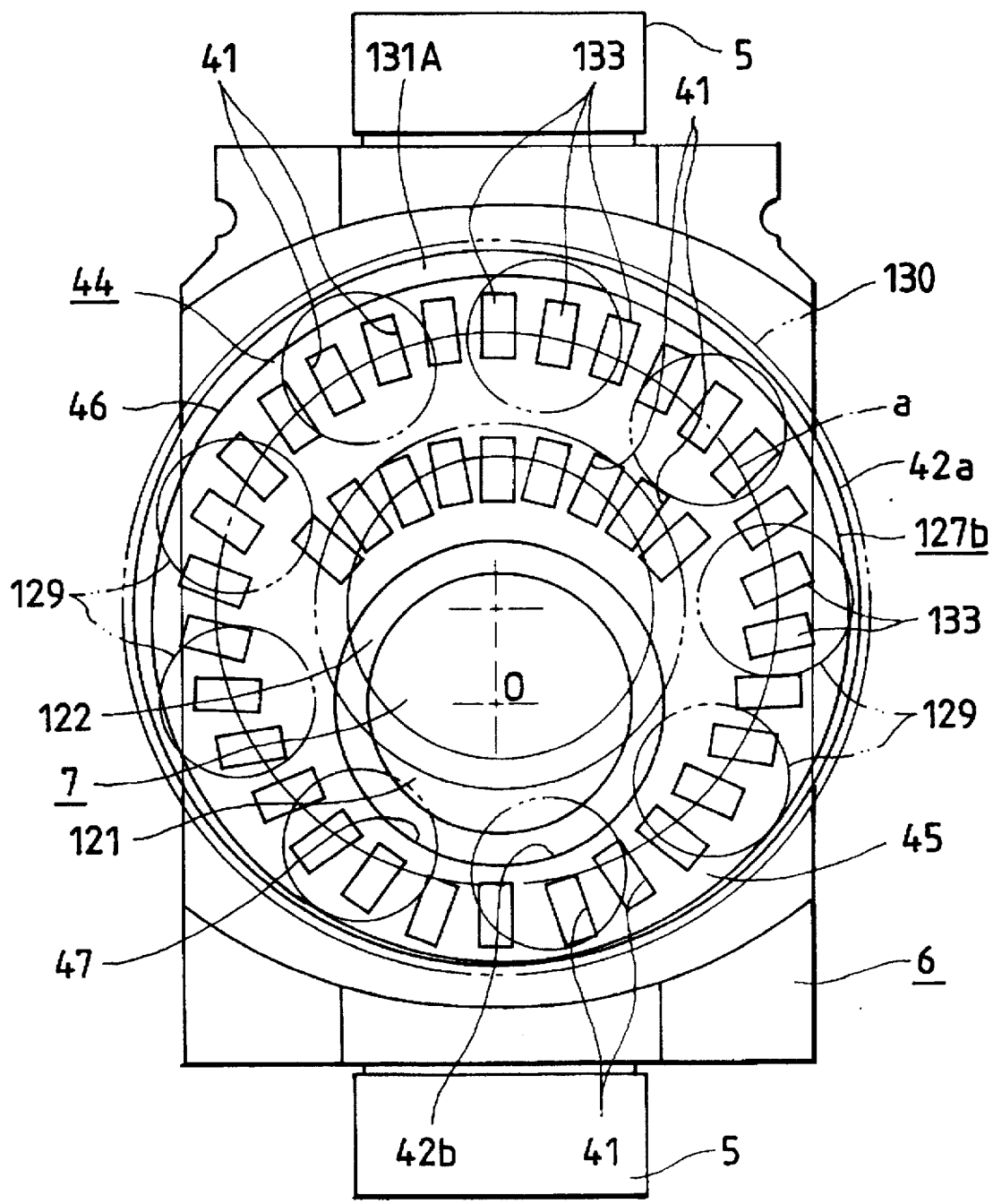
FIG. 33 is the same view as FIG. 30 showing the second structural example of the previous invention.

The holder 48 is formed by a base board 49 substantially in an oval shape, made by a metallic plate, a synthetic resin plate, or the like, on which a plurality of elongated rectangular pockets 41 and 41 are formed. Also, on a part of the base board 49, that is, a portion deviated to the one side in the longitudinal direction from its center (the lower side in the vertical direction in FIGS. 11 and 12), there are formed a circular hole 50, and a cut-off portion 51 protruding outward in the diametral direction from a part of the circular hole 50. To the circular hole 50, a protrusion 52 formed on the inner side face of the trunnion 6 is rotatively fitted without any play. One end of the circular hole 123 formed on the trunnion 6 through which the supporting shaft portion of a displacement shaft 7 of the supporting shaft portion 121 (see FIGS. 25 and 26 previously described or FIG. 20 to be described later) is open to the inner side of the protrusion 52. In a state that the circular hole 50 is fitted over the protrusion 52, the longitudinal direction of each of the pockets 41 and 41 formed on the base board 49 of the holder 48 is identical to the radial direction centering on the circular hole 50. Therefore, the axial direction of all the needles 133 and 133 forming the thrust needle bearing 127c is identical to the radial direction centering on the supporting shaft portion 121 that penetrates the circular hole 123.

Figure 11:
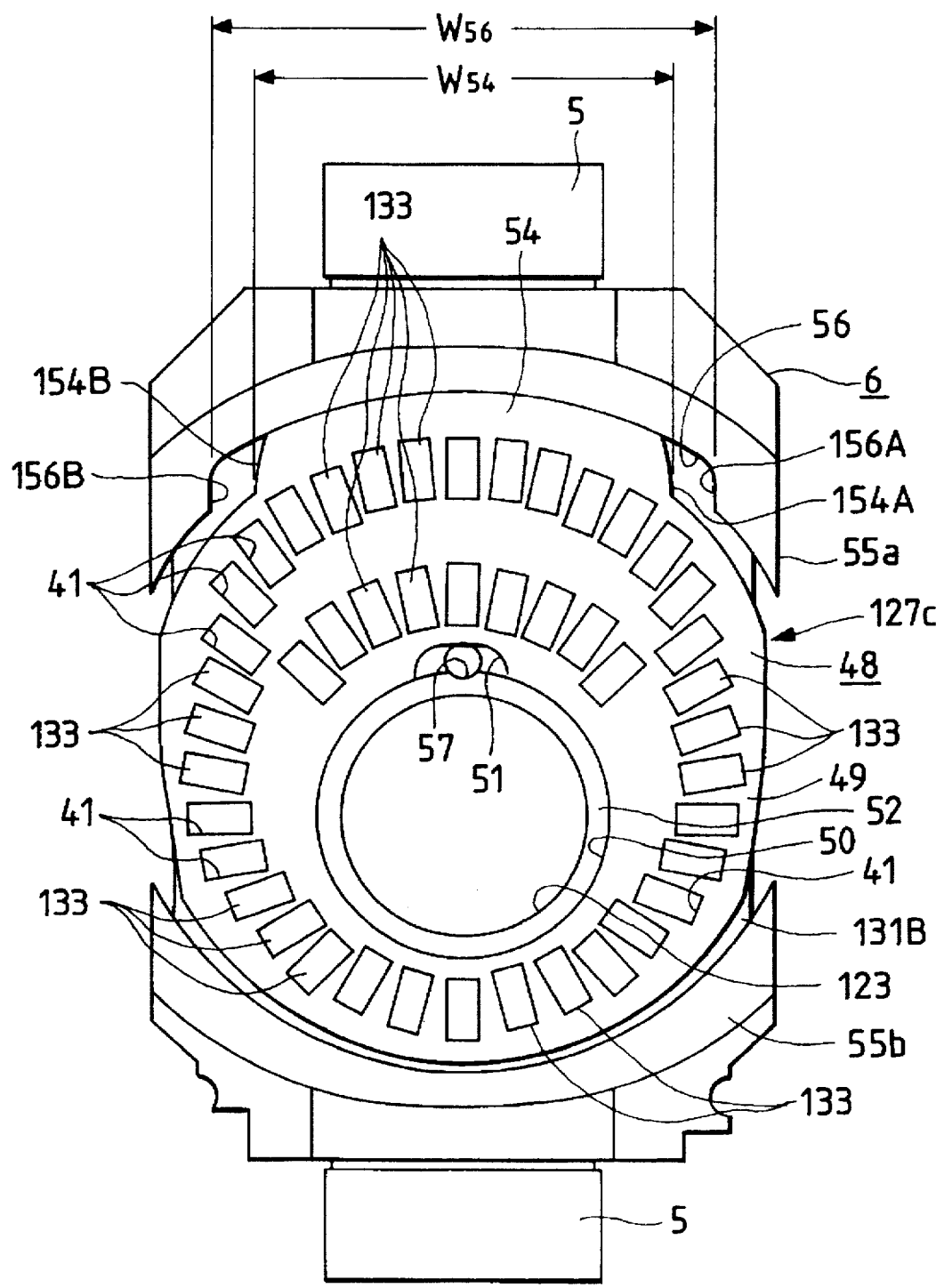
FIG. 11 is a view showing the inner side of a trunnion having a thrust needle bearing incorporated thereon, which represents a second embodiment of the present invention in the neutral state.
Figure 12:
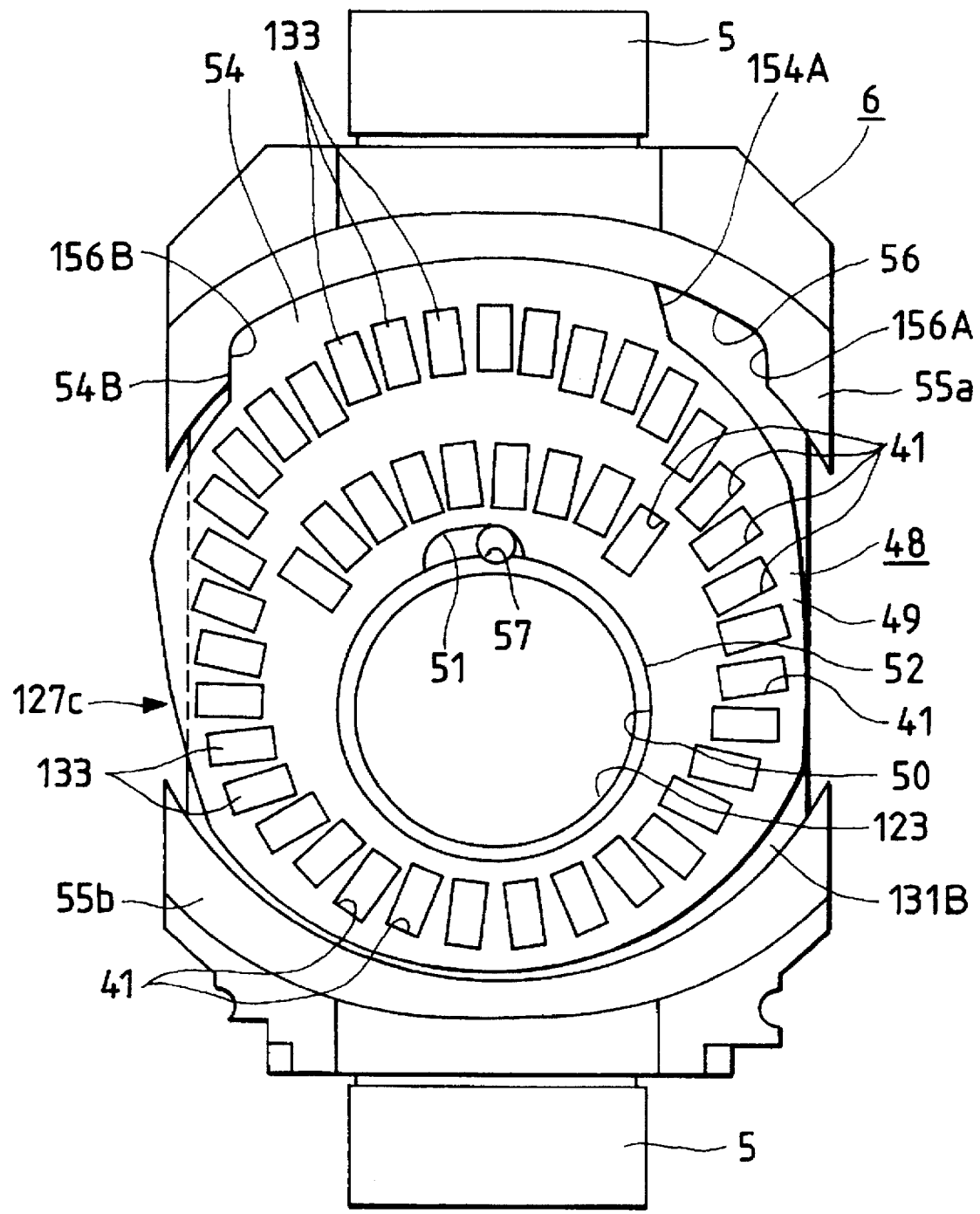
FIG. 12 is the same view as FIG. 11 showing the second embodiment in the maximum state of displacement.
Figure 13:
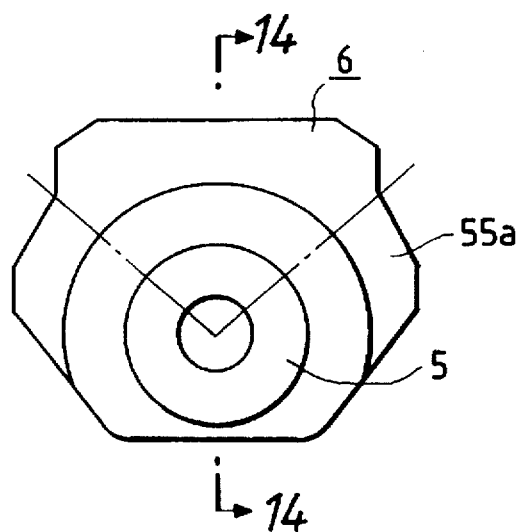
FIG. 13 is a view showing the trunnion represented in FIG. 11, which is observed from the top of FIG. 11.
Figure 14:
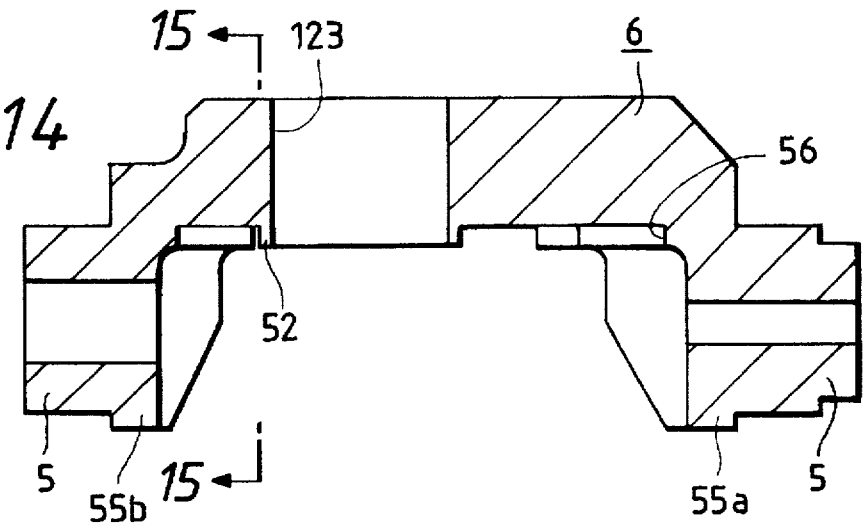
FIG. 14 is a cross-sectional view taken along line 14—14 in FIG. 13.
Figure 15:
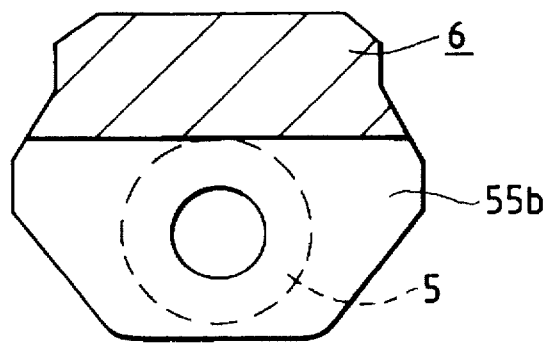
FIG. 15 is a cross-sectional view taken along line 15—15 in FIG. 14.

In this respect, for the embodiment represented in FIGS. 11 to 15, the plurality of pockets 41 and 41 are arranged in a potbellied shape so that the pitches between the pockets 41 and 41 themselves positioned on both sides in the width direction (both sides in the directions to the left and right in FIGS. 11 and 12) become narrower as the pockets are further away from the pivot portion 121 (upward direction in FIGS. 11 and 12). This arrangement is made in order to prevent the rolling surface of the needles 133 and 133 held in each of the pockets 41 and 41 from being projected from the race 131B irrespective of the swinging of the holder 48 centering on the protrusion 52. Also, both side edges of the base board 49 on the left and right sides thereof are formed to be angled so that the base board 49 is not protruded greatly from the left and right sides of the trunnion 6 irrespective of the swinging described above.

Further, in accordance with the toroidal type continuously variable transmission of the present invention, an extrusion 54 is formed on one end of the base board in the longitudinal direction (at the upper end in FIGS. 11 and 12). At both ends of the trunnion 6 in the longitudinal direction (at the upper and lower ends in FIGS. 11 and 12, at both ends in the front and rear sides in FIGS. 13 and 15, and at both ends in the left and right sides in FIG. 14) a recess 56 is formed in the intermediate section of the inner side face of the folded bending portion 55a facing the extrusion 54 among the folded bending portions 55a and 55b formed in a state of being folded toward the power roller installation side (at the front side in FIGS. 11 and 12 and at lower side in FIGS. 13 to 15). The width dimension $W_{56}$ of the recess 56 is slightly larger than the width dimension $W_{54}$ of the extrusion 54, that is, ($W_{56} > W_{54}$). Then, in a state that the circular hole 50 is fitted over the protrusion 52, the extrusion 54 is fitted into the recess 56 with play. Therefore, the holder 48 is swingable in the inner side of the recess 56 centering on the supporting shaft portion 121 within the range that the extrusion 54 is allowed to be displaced (that is, a stroke of ($W_{56}-W_{54}$)). Of the FIGS. 11 and 12 showing the present embodiment, FIG. 11 illustrates the state where the holder 48 is in a neutral position, and FIG. 12 illustrates the state that the holder is displaced at the maximum swing, respectively. However, in accordance with the present invention, no part of the needles 133 and 133 is projected from the race 131B in the state shown in FIG. 12 where the holder is displaced at the maximum swing, not to mention the state that the holder is in the neutral position as shown in FIG. 11. In this respect, a reference numeral 57 in FIGS. 11 and 12 designates an oil hole to circulate lubricant. The oil hole 57 is interfaced with the cut-off portion 51 in order to carry lubricant to the locations as required. Therefore, the size of the cut-off portion is determined so as to interface a part of the cut-off portion with the oil hole 57 irrespective of any displacement of the holder due to swinging.

The swinging range of the holder 48 is regulated by the arrangement that the left and right ends 154A and 154B of the extrusion 54 of the holder 48 abuts upon the left and right inner ends 156A and 156B of the recess 56 of the folded bending portion 55a.

In accordance with the toroidal type continuously variable transmission of the present invention as structured above, the angle of the swinging displacement of the holder 48 is regulated by the irregular coupling portion comprising the recess 56 formed on the intermediate section of the inner side face of the folded bending portion 55a of the trunnion 6, and the extrusion 54 formed on the intermediate section of one end edge of the holder 48 in the longitudinal direction. As a result, it is possible to prevent the needles 133 and 133 constituting the thrust needle bearing 27c from being projected from the race 31B forming the surface of the thrust raceway. Hence it becomes possible to prevent the rolling surface of the needles from being damaged due to the event that the rolling surface of each of the needles 133 and 133 may abut upon the edge of the race 31B. Also, each of the needles 133 and 133 can be reliably prevented from falling off the pockets 41 and 41 of the holder 48.

Figure 16:
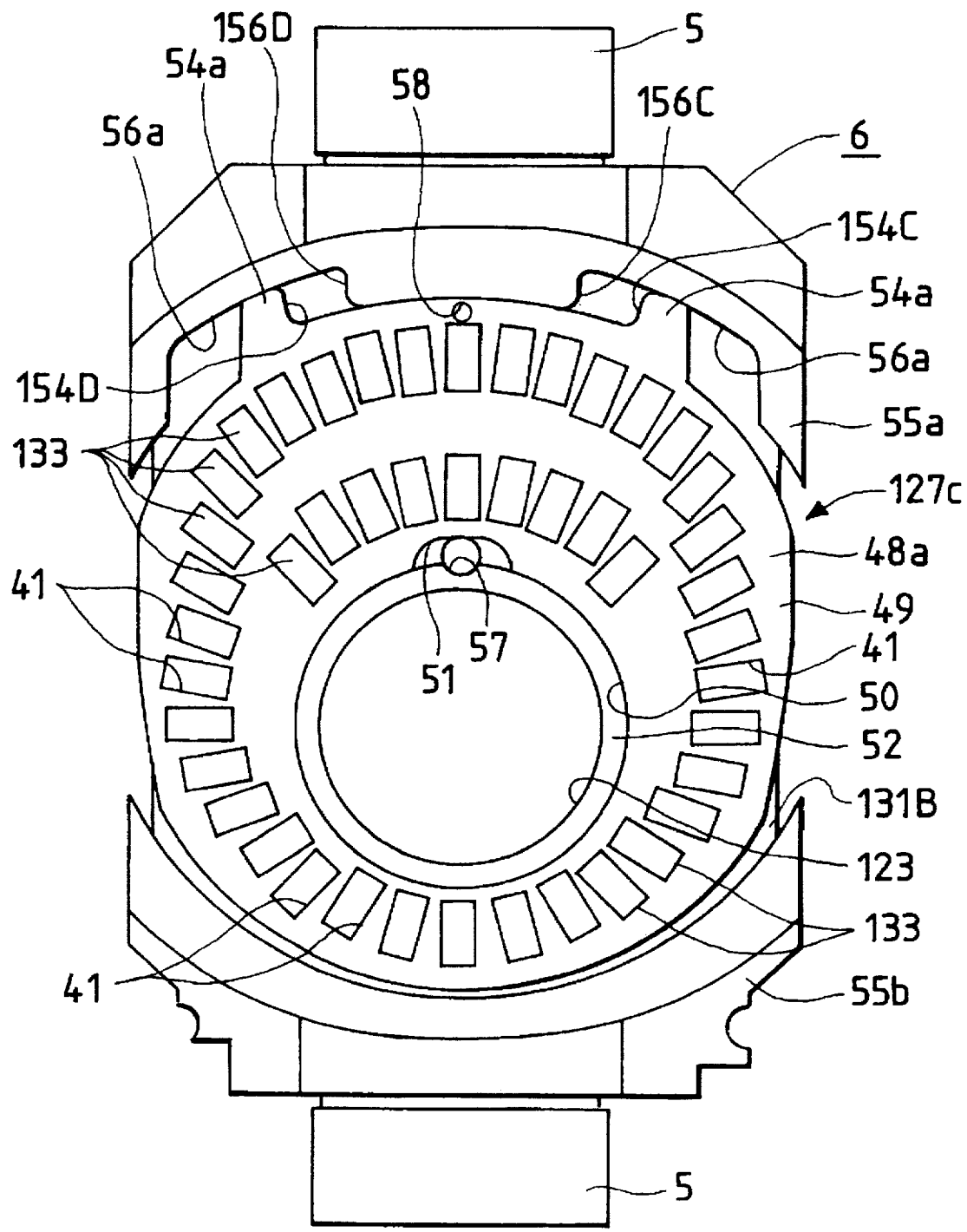
FIG. 16 is the same view as FIG. 11 showing a third embodiment of the present invention.
Figure 17:
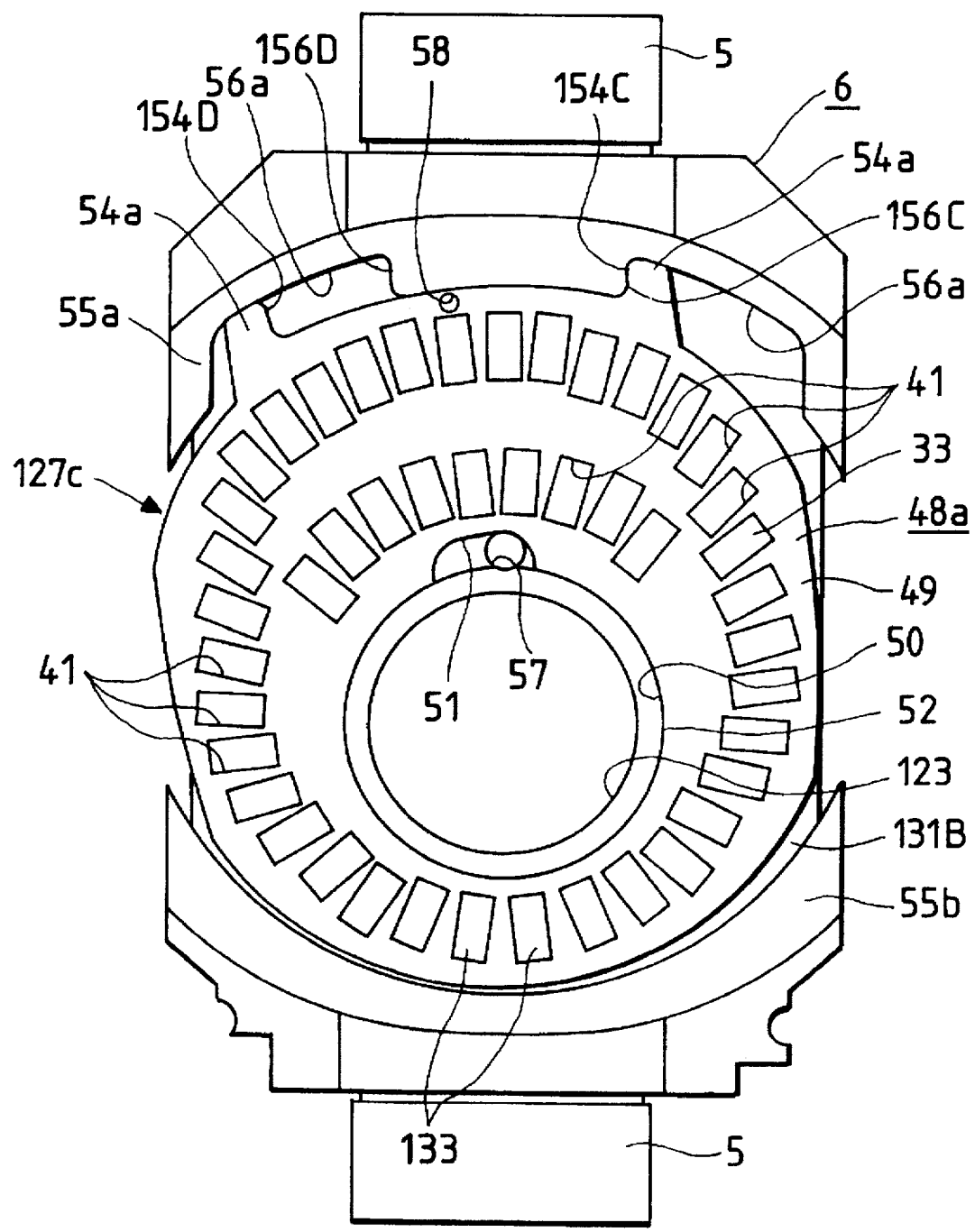
FIG. 17 is the same view as FIG. 12 showing the third embodiment of the present invention.

Now, FIGS. 16 and 17 are views showing a third embodiment of the present invention. For the present embodiment, the angle of swing displacement of a holder 48a is regulated by two irregular coupling portions comprising recesses 56a and 56a formed and positioned in two locations on the intermediate section of the inner side face of the folded bending portion 55a of a trunnion 6, and extrusions 54a and 54a formed and positioned in two locations in the intermediate section of one end edge of the holder 48a in the longitudinal direction. The other structures and functions are the same as those of the first embodiment described above. In this respect, a small circular hole 58 formed in the central portion of one end of the holder 48a in the longitudinal direction is for use of positioning the holder 48a at the time of an assembling operation.

The swinging range of the holder 48 is regulated by the arrangement that the end portions 154C and 154D of the extrusion 54a of the holder 48 abut upon the inner ends 156C and 156D of the recess 56a of the folded bending portion 55a, respectively.

Figure 18:
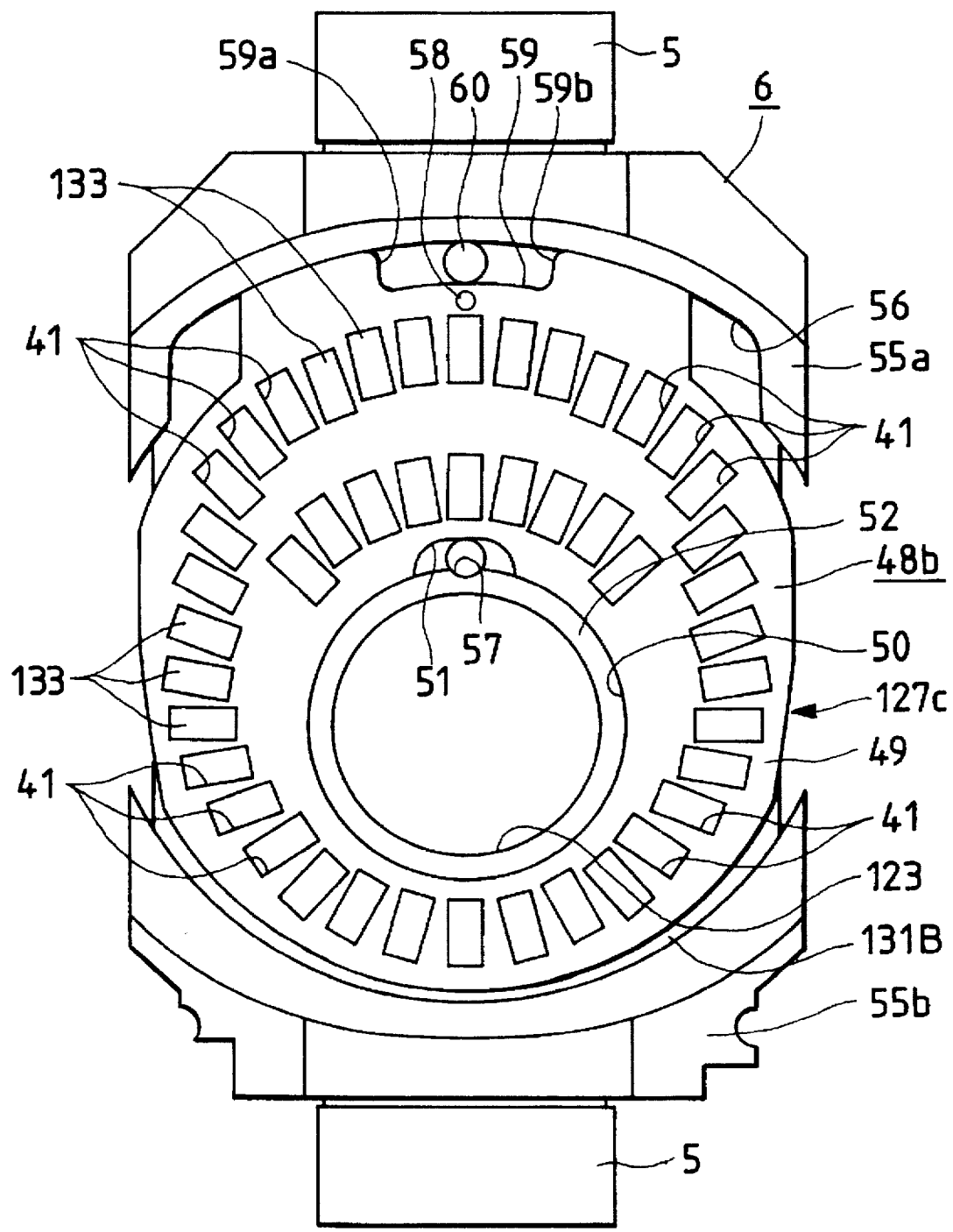
FIG. 18 is the same view as FIG. 11 showing a fourth embodiment of the present invention.
Figure 19:
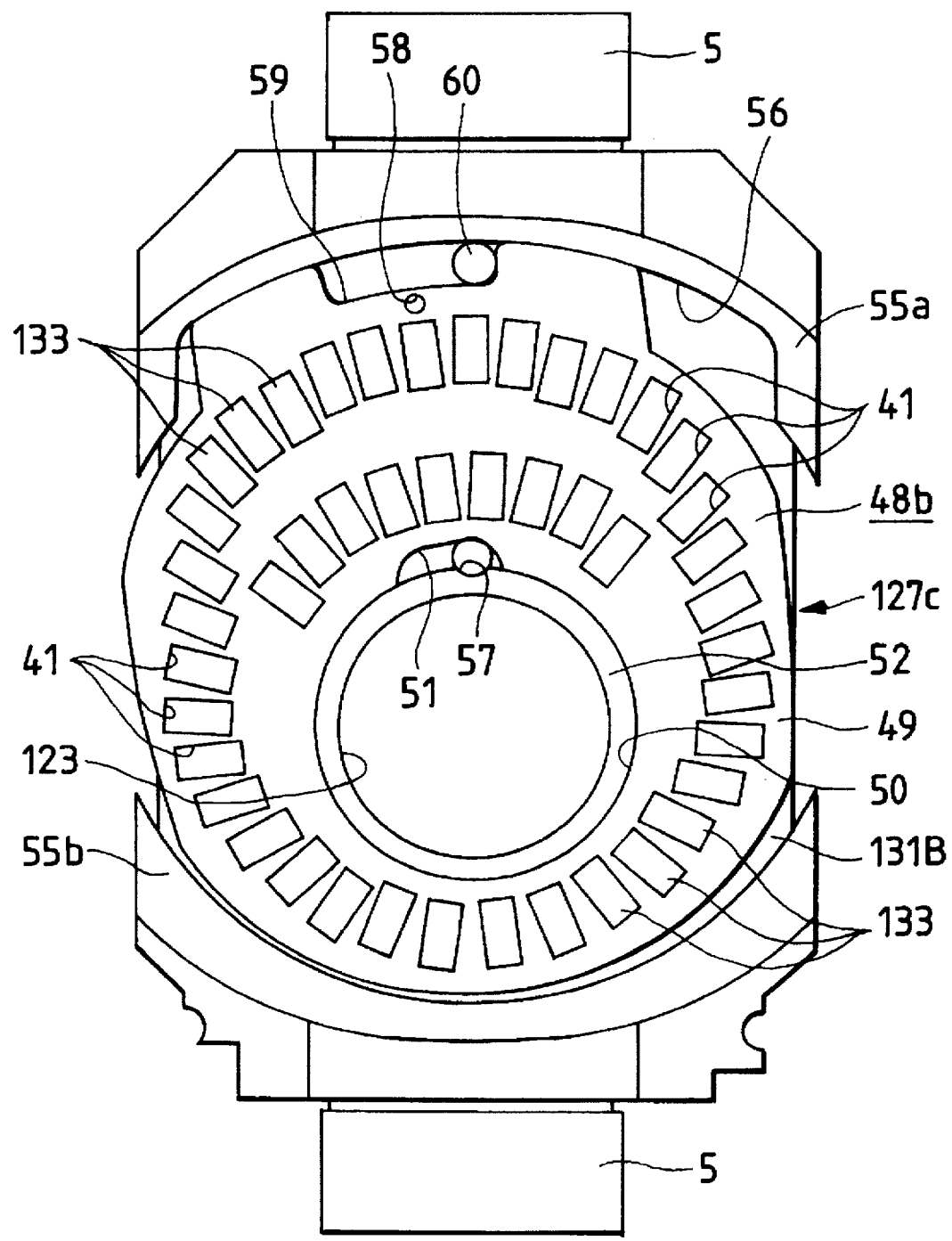
FIG. 19 is the same view as FIG. 12 showing the fourth embodiment of the present invention.

Now, FIGS. 18 and 19 are views showing a fourth embodiment of the present invention. For the present embodiment, a cut-off portion 59 is formed on one end edge (upper end edge in FIGS. 18 and 19) of a holder 48b in the longitudinal direction, and a pin 60 is planted on the central part of one end of the inner side face of a trunnion 6 to be protruded in the longitudinal direction. Then, with the inner side of the cut-off portion 59, which corresponds to a recess within the range, the pin 60, which also corresponds to an extrusion, is allowed to engage, thus forming an irregular coupling portion for regulating the angle of swinging displacement of the holder 48b. The other structures and functions are the same as those described in the second embodiment described earlier and the third embodiment described above.

The swinging range of the holder 48 is regulated by the arrangement that either one of the inner ends 59a and 59b on the left and right sides of the cut-off portion 59 of the holder 48 abuts upon the outer circumferential surface of the pin 60 planted inside the recess 56 of the folded bending portion 55a.

Figure 20:
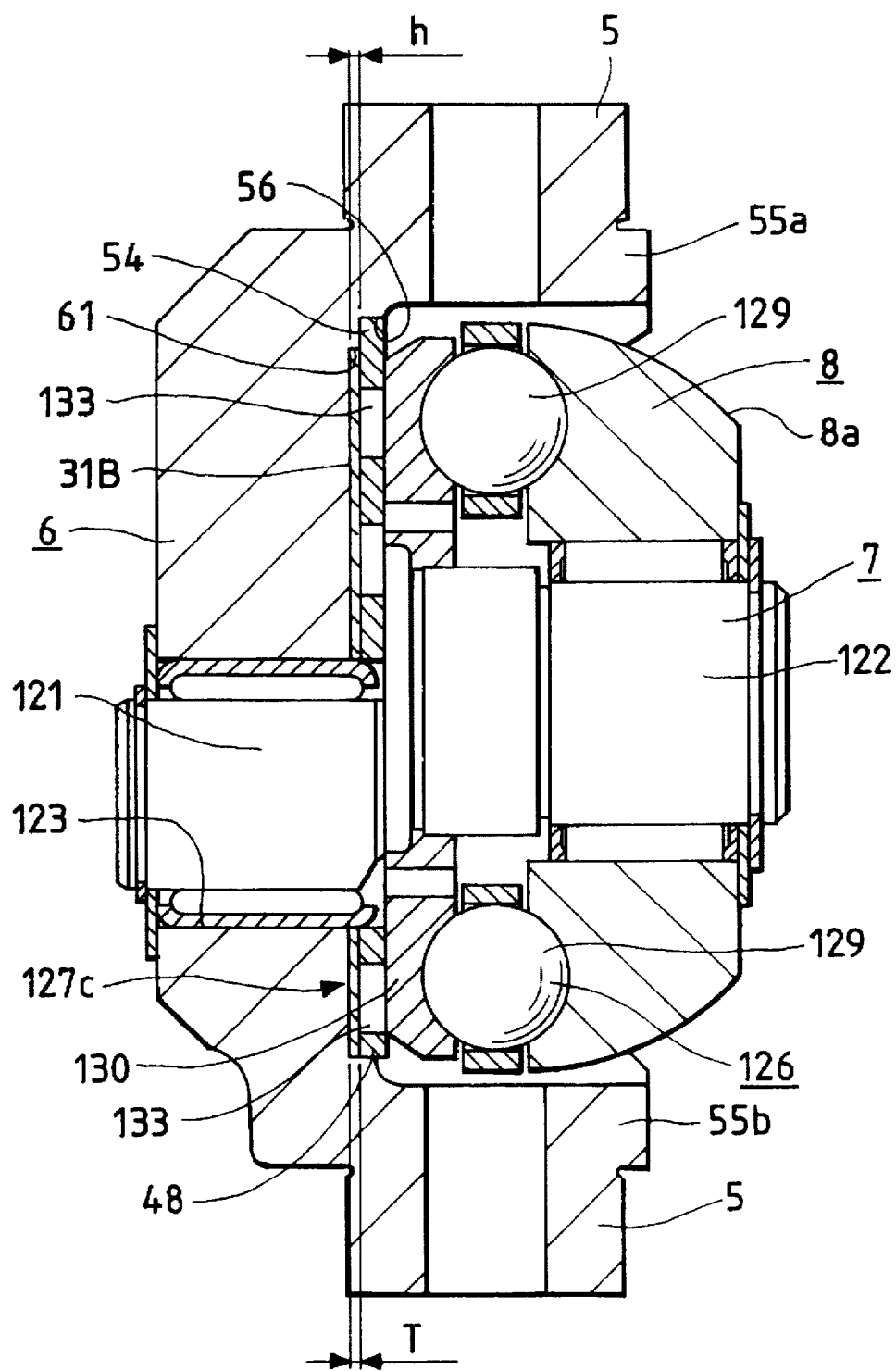
FIG. 20 is a cross-sectional view showing a fifth embodiment of the present invention in a state that the power roller is incorporated on the trunnion.
Figure 21:
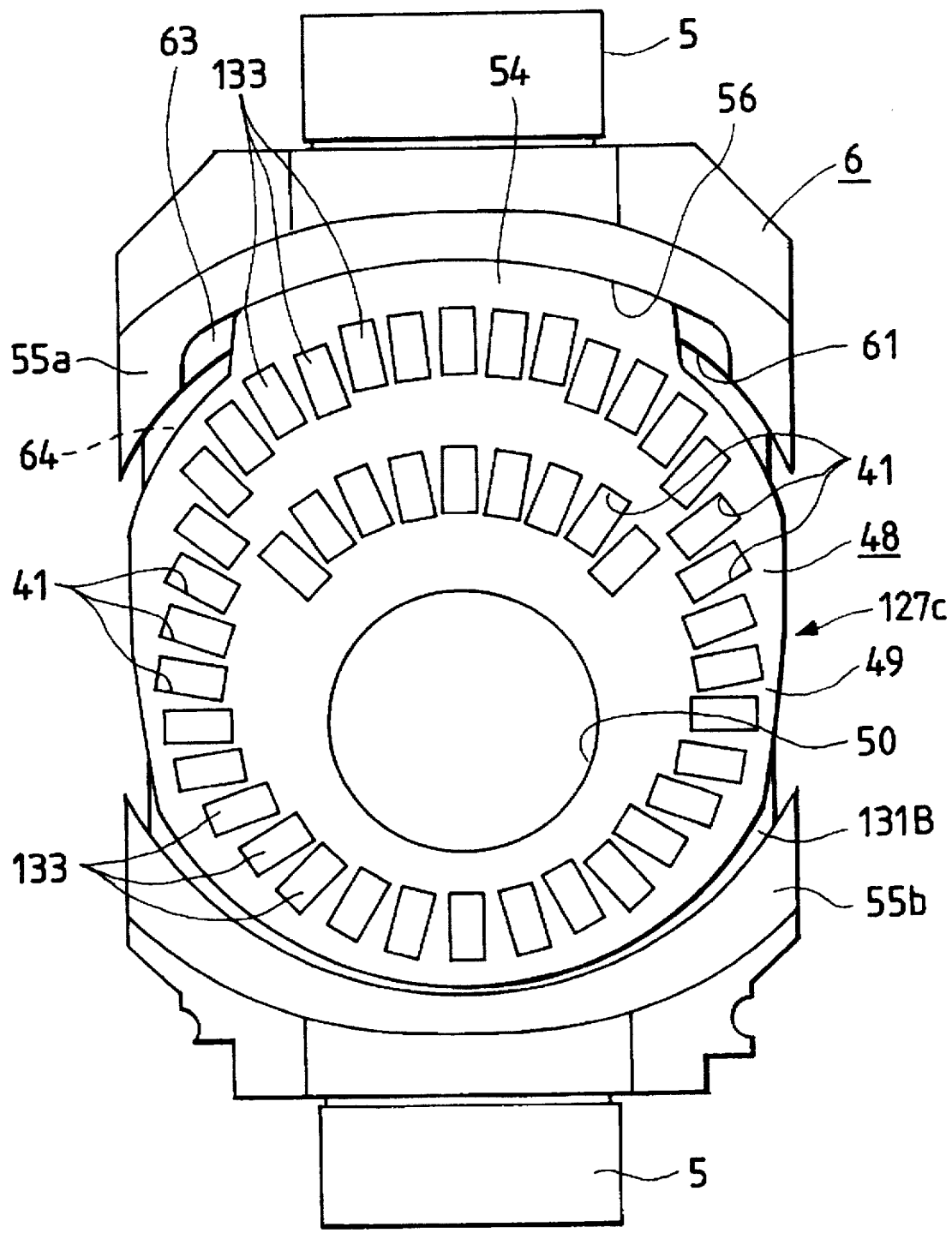
FIG. 21 is a view of the fifth embodiment represented in FIG. 20 by removing the power roller and thrust ball bearing, which is observed from the right-hand side of FIG. 20.
Figure 22:
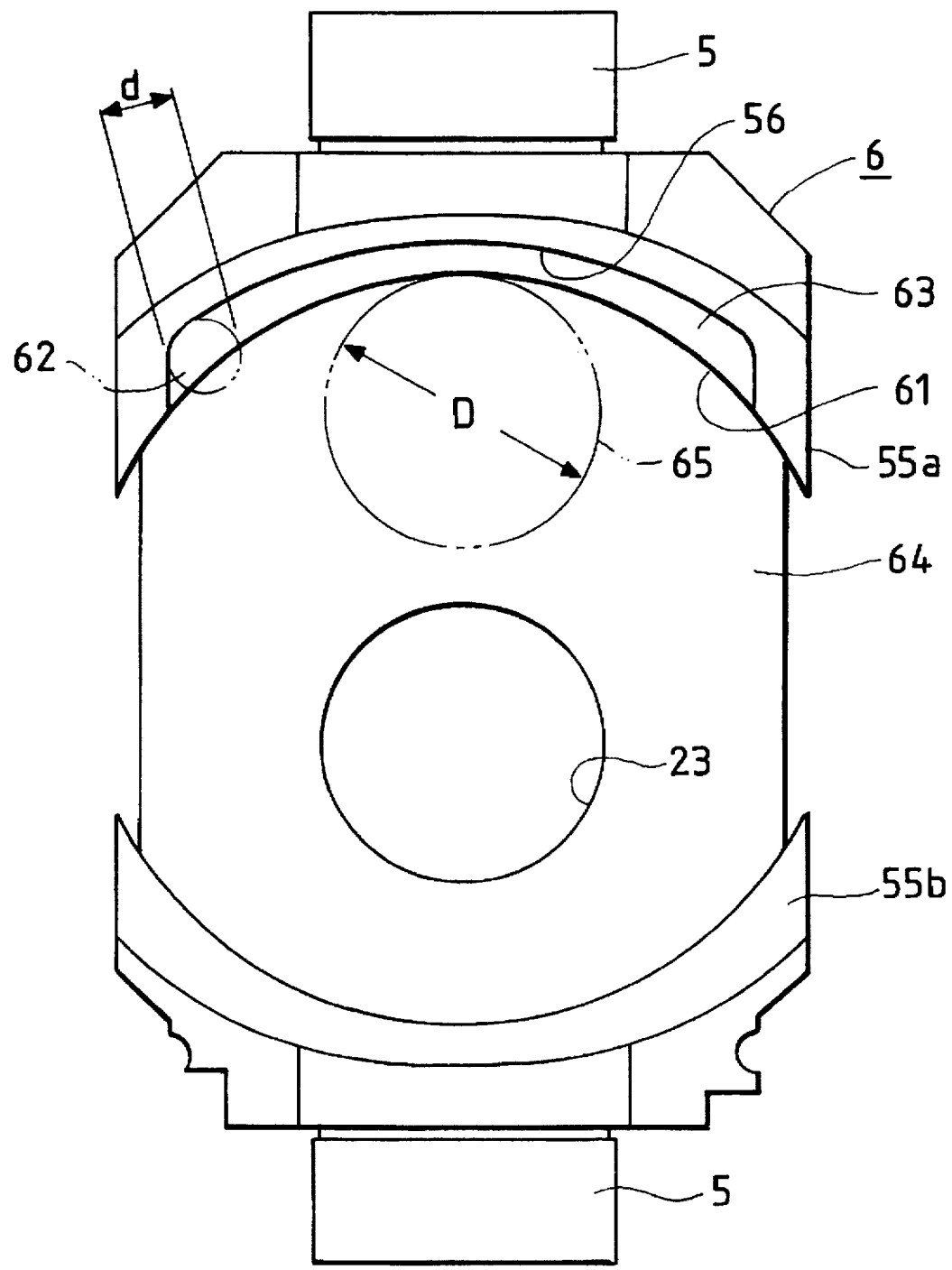
FIG. 22 is a view of the fifth embodiment represented in FIG. 20 by further removing the thrust needle bearing, which is observed from the right-hand side of FIG. 20.

Now, FIGS. 20 to 22 are views showing a fifth embodiment of the present invention. In the present embodiment, a step 61 is arranged on the inner side face of a trunnion 6. In other words, on the inner side face, a portion corresponding to a recess 56 formed on the inner side face of the folded bending portion 55a is protruded to the side where a power roller 8 is installed (on the right-hand side in FIG. 20, and on the front side in FIGS. 21 and 22) more than to a portion on the inner side face where a race 131B is attached. Here, a plurality of needles 133 and 133 constituting a thrust needle bearing 127C are in contact with the race. In accordance with the present embodiment shown in FIGS. 20 to 22, the height h of the step 61 is made equal to or smaller than the thickness dimension T of the race 131B, that is, (h≦T). In accordance with the present embodiment, the trunnion 6 can be processed efficiently because of such step 61 arranged on the inner side face of the trunnion 6.

Figure 6:
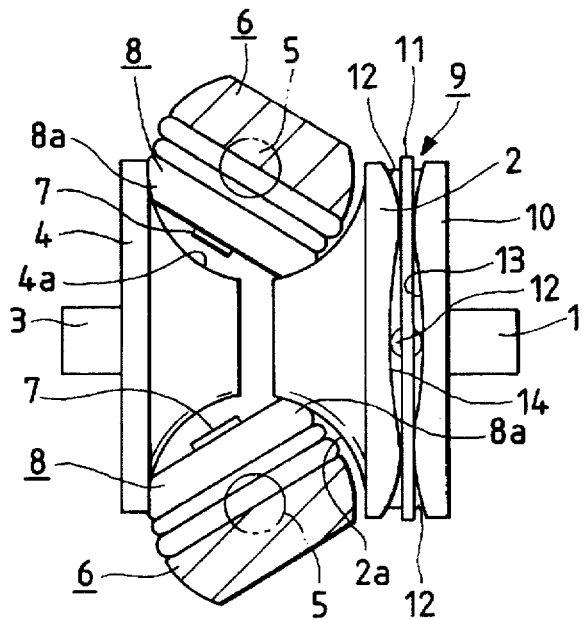
FIG. 6 is a side view which shows the basic structure of the conventional toroidal type continuously variable transmission in a state of the maximum deceleration.
Figure 7:
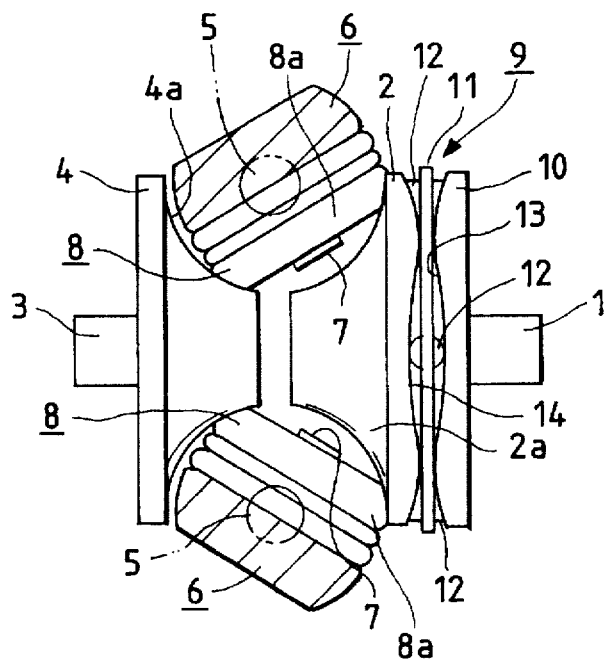
FIG. 7 is a side view which shows the basic structure of the conventional toroidal type continuously variable transmission in a state of the maximum acceleration.
Figure 23A:
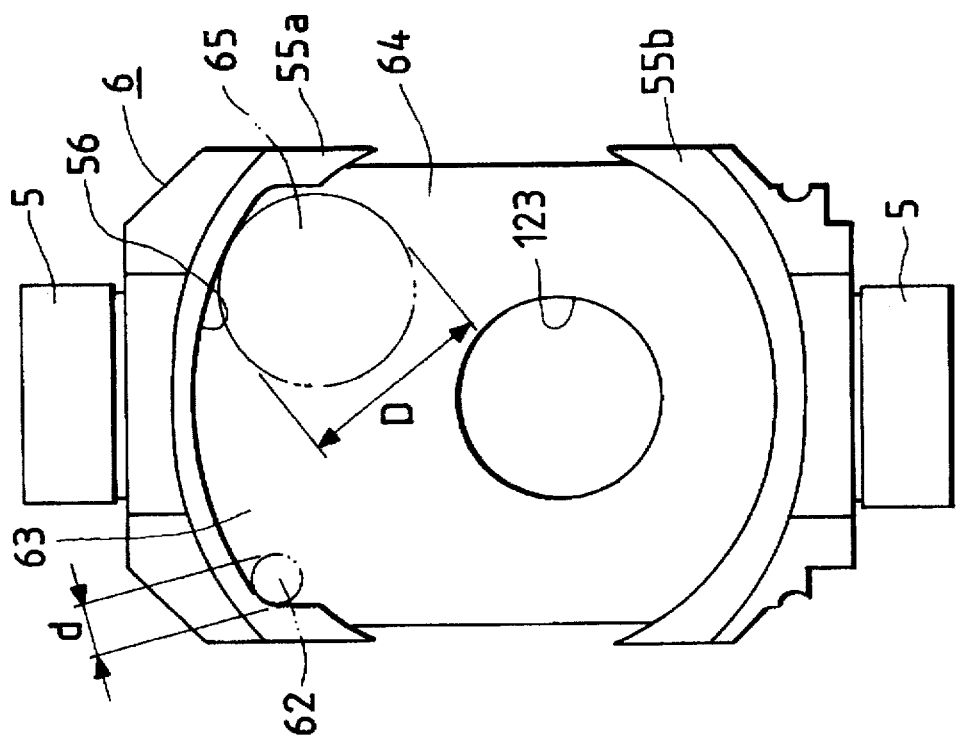
FIGS. 23A and 23B are views illustrating a first example of the difficulties in processing the trunnion that take place when the structure of the fifth embodiment is not adopted, and the views represent the trunnion for which the second embodiment is adopted, and observed in the same direction as FIG. 22.
Figure 23B:
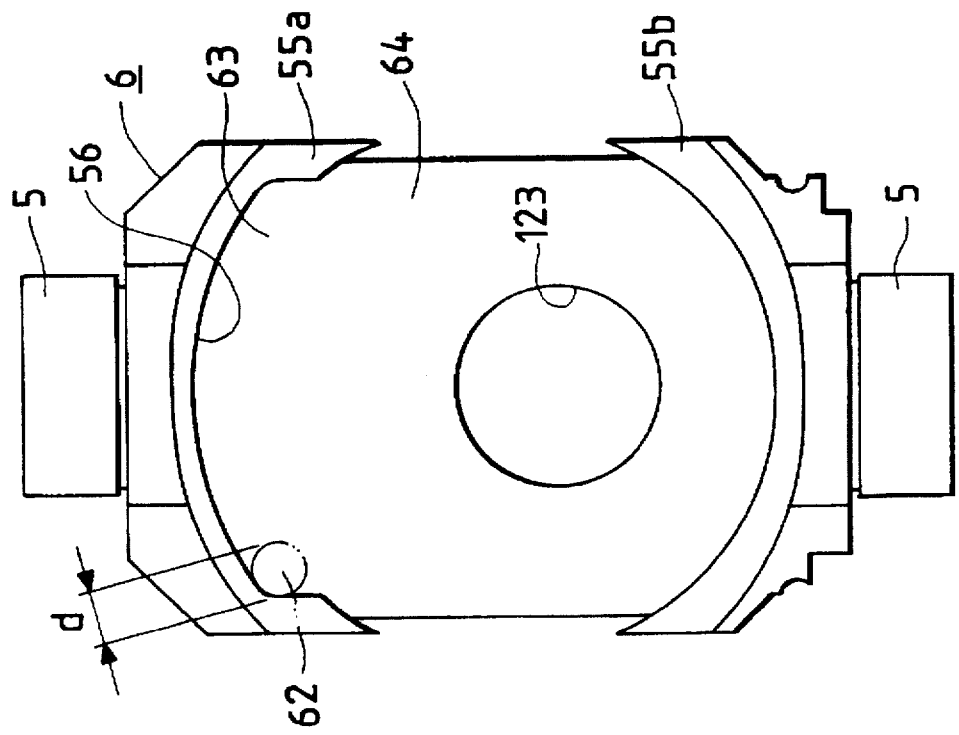
Figure 24:
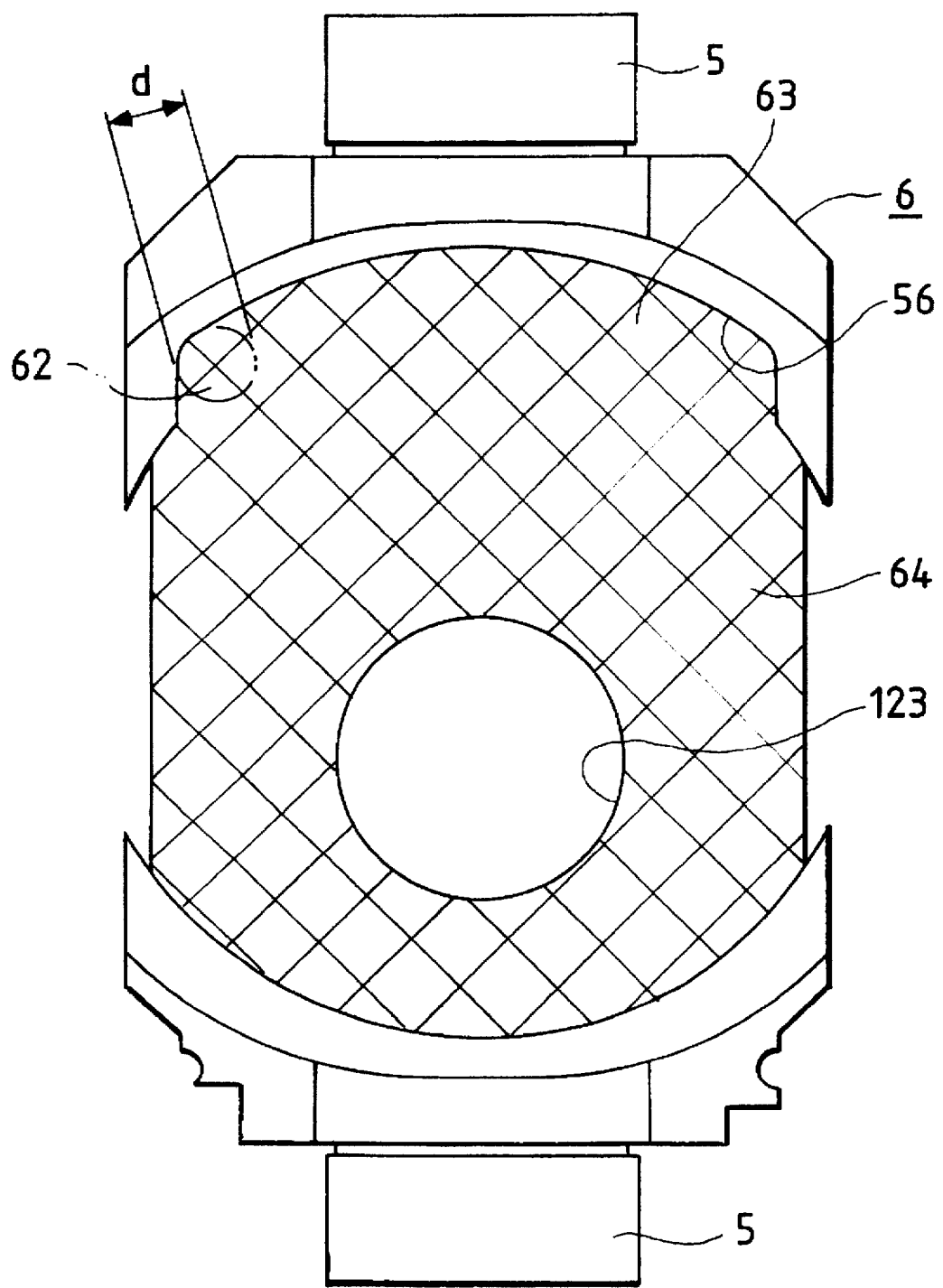
FIG. 24 is the same view as FIGS. 23A and 23B illustrating the second example of the difficulties in processing the trunnion.

With reference to FIGS. 22 to 24, the description will be made of the reasons why the efficient processing is possible. The distance between the center line of the pivots 5 and 5 arranged on both ends of the trunnion 6, and the inner side face of the trunnion 6 must be finished accurately, because the contact position should be exact between the circumferential face 8a of the power roller 8 and the inner side faces 2a and 4a of the disks 2 and 4 on the input and out sides (see FIGS. 6, 7 and 25). The trunnion 6 that requires a great strength is formed by a metallic material (mainly steel) and processed by forging. However, the aforesaid distance cannot be finished in the required precision only by means of forging, thus making it difficult to secure the flatness sufficiently on the inner side face with which the race 131B is in contact. Therefore, a cutting process is needed after the forging in order to finish the inner side face of the trunnion 6 to meet such dimensional requirement, but a cutting process of the kind can hardly be performed by a tool 65 having a large outer diameter as shown in FIG. 23A, for example, subsequent to processing the major portion of the inner side face of the trunnion 6 by use of the same tool. As a result, each corner of the folded bending portion 55a is processed by a small tool 62 having a diameter d as shown in FIGS. 23A and 23B. In this respect, FIG. 23A illustrates the initial stage of processing by use of the small tool 62, and FIG. 23B illustrates the terminating stage thereof, respectively. With such a processing method as this, the flatness of the inner side face can be enhanced as compared to the finish only by means of forging. However, in order to secure the dimensional precision and flatness at a high level, it is not desirable to exchange tools, depending on processing locations (positions in the surface direction).

The larger the diameter of a rotational tool to be used, the more the efficiency is enhanced for the cutting process. However, the maximum diameter of the rotational tool to be used is automatically limited by the configuration of the surface to be processed. For example, if a portion including the recess 56 is processed at a time as indicated by slanted cross-stripes in FIG. 24, it is necessary to process the entire portion indicated by the slanted cross-stripes by use of the tool 62 having a smaller diameter so that the corners can also be processed. As a result, it takes longer to complete the processing, hence increasing the manufacturing costs of the trunnion 6. If the inner side face of the trunnion is processed by the application of the method shown in FIGS. 23A and 23B, it is possible to obtain a surface precision practically acceptable. However, there is still a possibility that fine steps occur on parts of the processed surface.

In contrast, according to the present embodiment, the step 61 is originally present between the portion 63 corresponding to the recess 56, and the portion 64 where the race 131B is attached. Therefore, these two portions 63 and 64 need not be processed by one and the same tool. Here, as shown in FIG. 22, only with a tool 62 having a smaller diameter d, the portion 63 corresponding to the recess 56 is processed, while the portion 64 where the race 131B is attached can be processed by use of the tool 64 having a larger diameter D. Consequently, it is possible to efficiently process the portion 64 where the race 131B is attached, that is, the portion having a wider area than the portion corresponding to the recess 56. Compared to processing the entire area by use of a tool having a small diameter alone, the trunnion 6 can be processed more efficiently by the application of the method described above, thus making it possible to reduce the manufacturing costs of the trunnion 6 and the toroidal type continuously variable transmission in which the trunnion 6 is incorporated. The other structures and functions are the same as those described in the first embodiment. Here, the cut-off portion 51, the small hole 58 for positioning use, and the oil hole 57 provided for the trunnion 6 are omitted in the representation of FIGS. 21 to 24.

With a toroidal type continuously variable transmission of the present invention structured to function as described above, it is possible to enhance the durability of the outer ring constituting the thrust ball bearing as in the previous invention. Also, it is arranged to prevent the needles constituting the thrust needle bearing from being projected from the surface of thrust raceway. Therefore, the rolling surfaces of the needles are prevented from being damaged by the event that such rolling surface may abut upon the edge of the surfaces of the thrust raceway. It is also possible to prevent the needles from falling off the pockets of the holder reliably. In this way, the enhancement of the durability and reliability can be implemented for the toroidal type continuously variable transmission to be structured with inclusion of the outer ring and needles as described above.

What is claimed is:

1. A trunnion arrangement for a toroidal type continuously variable transmission, comprising:

first and second disks supported for rotation about a central axis and each provided with a respective circularly concave surface, the concave surfaces being arranged to face each other;

a power roller nipped between said first and second disks to rotate by contacting said concave surfaces of said first and second disks;

a trunnion swingable about a swing axis transverse to said central axis and having a circular hole extending in a direction perpendicular to said swing axis;

a displacement shaft provided with first and second shaft portions that are parallel and eccentric to each other, said first shaft portion being fitted into said circular hole and said second shaft portion rotatively supporting said power roller;

a thrust ball bearing disposed for bearing thrust load exerted on said power roller and allowing said power roller to rotate, said thrust ball bearing having an outer ring;

a thrust needle bearing arranged between said outer ring of said thrust ball bearing and said trunnion for bearing thrust load exerted by said power roller on said outer ring of the thrust ball bearing and allowing said second shaft portion and said outer ring of the thrust ball bearing to swing about said first shaft portion, said thrust needle bearing being provided with a holder having pockets rotatively supporting a plurality of needles and having a circular through hole aligned with said circular hole of said trunnion; and a radial needle bearing disposed in said circular hole of said trunnion and between said first shaft portion and said trunnion to rotatively support said first shaft portion with respect to said trunnion, said radial needle bearing having an outer ring, wherein an inner surface of said trunnion, where said thrust needle bearing is arranged, is substantially flat, and said outer ring of said radial needle hearing protrudes from the inner surface into said through hole of said holder where said holder and said outer ring of said radial needle hearing are fittingly coupled without play.

2. A trunnion arrangement according to claim 1, wherein said thrust needle bearing includes a race member having a hole aligned with said through hole of said holder and disposed between said holder and said trunnion, and said outer ring of said radial needle bearing is disposed within said hole of said race member and in engagement with said race member.

3. A trunnion arrangement according to claim 2, wherein an amount of protrusion of said outer ring of said radial needle bearing from said inner surface is larger than a thickness of said race member in an axial direction of said outer ring of said radial needle bearing and smaller than the sum of the thickness of said race member in said axial direction and a thickness of said holder in said axial direction.

* * * * *